US011908332B2

(12) United States Patent
Faccin

(10) Patent No.: US 11,908,332 B2
(45) Date of Patent: Feb. 20, 2024

(54) WAYPOINT BASED FLIGHT DECLARATION SIGNALING

(71) Applicant: QUALCOMM Incorporated, San Diego, CA (US)

(72) Inventor: Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 16/937,259

(22) Filed: Jul. 23, 2020

(65) Prior Publication Data

US 2022/0028279 A1 Jan. 27, 2022

(51) Int. Cl.
  *G08G 5/00* (2006.01)
  *B64C 39/02* (2023.01)
  *G05D 1/10* (2006.01)
  *G05D 1/00* (2006.01)

(52) U.S. Cl.
  CPC ........... *G08G 5/003* (2013.01); *B64C 39/024* (2013.01); *G05D 1/101* (2013.01); *G08G 5/0069* (2013.01)

(58) Field of Classification Search
  CPC ...... G08G 5/00; G08G 5/0004; G08G 5/0013; G08G 5/0017; G08G 5/0021; G08G 5/0026; G08G 5/003; G08G 5/0034; G08G 5/0039; G08G 5/0043; G08G 5/0047; G08G 5/006; G08G 5/0069; H04W 4/44
  See application file for complete search history.

(56) References Cited

U.S. PATENT DOCUMENTS

| 9,734,723 | B1 | 8/2017 | Bruno et al. |
| 9,990,854 | B1 | 6/2018 | Elmasry et al. |
| 11,196,157 | B1 | 12/2021 | Bonney et al. |

(Continued)

FOREIGN PATENT DOCUMENTS

WO   WO-2018203120 A1   11/2018

OTHER PUBLICATIONS

Fraunhofer HHI, et al., "Flight Path Information Report: Trigger and Content", 3GPP TSG-WG2 Meeting #102, R2-1807212_UAV_Flight ReportTriggerContent, Busan, Korea. Retrieved from the Internet: URL:http://www.3gpp.org/ftp/Meetings%5F3GPP%5FSYNC/RAN2/Docs/ [retrieved on May 20, 2018]. (Year: 2018).*

(Continued)

*Primary Examiner* — Christian Chace
*Assistant Examiner* — Katherine Marie Fitzharris
(74) *Attorney, Agent, or Firm* — Holland & Hart LLP

(57) ABSTRACT

Methods, systems, and devices for wireless communications are described. In some systems, a user equipment (UE) (e.g., an unmanned aerial vehicle (UAV)) may receive an approved flight plan including approved flight plan sectors. The UE may also receive a query from a network node, the query including an indication of a subset of the plurality of approved flight plan sectors and a request for a plurality of waypoints of the UE within the indicated subset of the plurality of approved flight plan sectors. The UE may further determine, in response to receiving the query from the network node, a flight path including the plurality of waypoints of the UE for the indicated subset of the plurality of approved flight plan sectors based on the received approved flight plan, and the UE may transmit, to the network node, a flight declaration message including the waypoints of the UE.

30 Claims, 20 Drawing Sheets

(56) References Cited

U.S. PATENT DOCUMENTS

2017/0263132 A1\* 9/2017 Butler .................. G08G 5/0026
2021/0241634 A1\* 8/2021 Sarim .................. G08G 5/0073

OTHER PUBLICATIONS

Fraunhofer HHI, et al., "Flight Path Information Report: Trigger and Content", 3GPP Draft, 3GPP TSG-WG2 Meeting #102, R2-1807212_UAV_Flight_Report_Trigger_Content, 3rd Generation Partnership Project (3GPP), Mobile Competence Centre, 650, Route Des Lucioles, F-06921 Sophia-Antipolis Cedex, France, No. Busan, Korea, May 21, 2018-May 25, 2018, May 20, 2018 (May 20, 2018), XP051443621, pp. 1-5, Retrieved from the Internet: URL:http://www.3gpp.org/ftp/Meetings%5F3GPP%5FSYNC/RAN2/Docs/ [retrieved on May 20, 2018] the Whole Document.
Partial International Search Report—PCT/US2021/034563—ISA/EPO—dated Sep. 10, 2021.
International Search Report and Written Opinion—PCT/US2021/034563—ISA/EPO—dated Nov. 2, 2021.

\* cited by examiner

WAYPOINT BASED FLIGHT DECLARATION SIGNALING

FIELD OF TECHNOLOGY

The following relates generally to wireless communications and more specifically to waypoint based flight declaration signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communication systems may support communications between a unmanned aerial vehicle (UAV—a type of UE) and a number of components of the wireless communication system while the UAV is traveling throughout a service area of one or more components of the wireless communication system. A UAV may be assigned contiguous blocks of airspace defining a volume of space through which the UAV may be cleared to operate within corresponding time periods as part of a flight clearance. However, there may be incompatibilities between a volume-based flight declaration and flight path techniques utilized by the UAV or a wireless communications system. Moreover, without knowledge of the UAV's position within the assigned contiguous blocks of airspace, adequate spacing and collision avoidance for other UAV's operating within the same blocks of airspace may not be assured.

SUMMARY

The described techniques relate to improved methods, systems, devices, and apparatuses that support waypoint based flight declaration signaling. A method of wireless communications at a user equipment (UE) (e.g., a UAV) is described. The method may include receiving an approved flight plan including a set of approved flight plan sectors, receiving a query from a network node, the query including an indication of a subset of the set of approved flight plan sectors and a request for a set of waypoints of the UE within the indicated subset of the set of approved flight plan sectors, determining, in response to receiving the query from the network node, a flight path including the set of waypoints of the UE for the indicated subset of the set of approved flight plan sectors based on the received approved flight plan, and transmitting, to the network node, a flight declaration message including the determined set of waypoints.

An apparatus for wireless communications at a UE is described. The apparatus may include a processor, memory coupled (e.g., operatively, communicatively, functionally, electronically, electrically, etc.) with the processor, and instructions stored in the memory. The instructions may be executable by the processor to cause the apparatus to receive an approved flight plan including a set of approved flight plan sectors, receive a query from a network node, the query including an indication of a subset of the set of approved flight plan sectors and a request for a set of waypoints of the UE within the indicated subset of the set of approved flight plan sectors, determine, in response to receiving the query from the network node, a flight path including the set of waypoints of the UE for the indicated subset of the set of approved flight plan sectors based on the received approved flight plan, and transmit, to the network node, a flight declaration message including the determined set of waypoints.

Another apparatus for wireless communications at a UE is described. The apparatus may include means for receiving an approved flight plan including a set of approved flight plan sectors, receiving a query from a network node, the query including an indication of a subset of the set of approved flight plan sectors and a request for a set of waypoints of the UE within the indicated subset of the set of approved flight plan sectors, determining, in response to receiving the query from the network node, a flight path including the set of waypoints of the UE for the indicated subset of the set of approved flight plan sectors based on the received approved flight plan, and transmitting, to the network node, a flight declaration message including the determined set of waypoints.

A non-transitory computer-readable medium storing code for wireless communications at a UE is described. The code may include instructions executable by a processor to receive an approved flight plan including a set of approved flight plan sectors, receive a query from a network node, the query including an indication of a subset of the set of approved flight plan sectors and a request for a set of waypoints of the UE within the indicated subset of the set of approved flight plan sectors, determine, in response to receiving the query from the network node, a flight path including the set of waypoints of the UE for the indicated subset of the set of approved flight plan sectors based on the received approved flight plan, and transmit, to the network node, a flight declaration message including the determined set of waypoints.

In some examples of the method, apparatuses, and non-transitory computer-readable medium described herein, determining the flight path may include operations, features, means, or instructions for calculating the set of waypoints based on a trajectory of the UE, one or more factors external to the UE, or both.

In some examples of the method, apparatuses, and non-transitory computer-readable medium described herein, the received query indicates a minimum, a maximum, or both, of number of waypoints for inclusion in the flight declaration message.

In some examples of the method, apparatuses, and non-transitory computer-readable medium described herein, receiving the query from the network node may include operations, features, means, or instructions for receiving the query from the network node via RRC signaling.

In some examples of the method, apparatuses, and non-transitory computer-readable medium described herein, receiving the query from the network node may include operations, features, means, or instructions for receiving a set of queries from a set of network nodes.

In some examples of the method, apparatuses, and non-transitory computer-readable medium described herein, each of the set of waypoints includes an expected three dimensional position of the UE corresponding to the waypoint within a corresponding one of the subset of the set of approved flight plan sectors.

In some examples of the method, apparatuses, and non-transitory computer-readable medium described herein, each of the set of waypoints further includes a timestamp indicating a minimum expected entry time and a maximum expected exit time of the UE corresponding to the expected three dimensional position corresponding to the waypoint.

In some examples of the method, apparatuses, and non-transitory computer-readable medium described herein, the set of approved flight plan sectors includes a set of contiguous flight plan sectors.

In some examples of the method, apparatuses, and non-transitory computer-readable medium described herein, each flight plan sector of the set of contiguous flight plan sectors includes a volume and a time period corresponding to a duration that the UE may be permitted to occupy the volume.

In some examples of the method, apparatuses, and non-transitory computer-readable medium described herein, each approved flight plan sector of the set of approved flight plan sectors includes one or both of a sector identification or a sector number.

A method of wireless communications at a network node is described. The method may include receiving a flight declaration request from a UE, generating, for the UE, an approved flight plan including a set of approved flight plan sectors based on the flight declaration request, determining a subset of network nodes based on a mapping between the set of approved flight plan sectors and a position of each network node of the subset of network nodes, and transmitting a node subset flight plan to the subset of the network nodes including the expected positions of the UE within the set of approved flight plan sectors.

An apparatus for wireless communications at a network node is described. The apparatus may include a processor, memory coupled (e.g., operatively, communicatively, functionally, electronically, electrically, etc.) with the processor, and instructions stored in the memory. The instructions may be executable by the processor to cause the apparatus to receive a flight declaration request from a UE, generate, for the UE, an approved flight plan including a set of approved flight plan sectors based on the flight declaration request, determine a subset of network nodes based on a mapping between the set of approved flight plan sectors and a position of each network node of the subset of network nodes, and transmit a node subset flight plan to the subset of the network nodes including the expected positions of the UE within the set of approved flight plan sectors.

Another apparatus for wireless communications at a network node is described. The apparatus may include means for receiving a flight declaration request from a UE, generating, for the UE, an approved flight plan including a set of approved flight plan sectors based on the flight declaration request, determining a subset of network nodes based on a mapping between the set of approved flight plan sectors and a position of each network node of the subset of network nodes, and transmitting a node subset flight plan to the subset of the network nodes including the expected positions of the UE within the set of approved flight plan sectors.

A non-transitory computer-readable medium storing code for wireless communications at a network node is described. The code may include instructions executable by a processor to receive a flight declaration request from a UE, generate, for the UE, an approved flight plan including a set of approved flight plan sectors based on the flight declaration request, determine a subset of network nodes based on a mapping between the set of approved flight plan sectors and a position of each network node of the subset of network nodes, and transmit a node subset flight plan to the subset of the network nodes including the expected positions of the UE within the set of approved flight plan sectors.

In some examples of the method, apparatuses, and non-transitory computer-readable medium described herein, determining the subset of nodes may include operations, features, means, or instructions for calculating the expected positions of the UE within a subset of the set of approved flight plan sectors based on the position and coverage area of the subset of the network nodes.

In some examples of the method, apparatuses, and non-transitory computer-readable medium described herein, the node subset flight plan includes the expected positions of the UE within a coverage area of the subset of the network nodes.

Some examples of the method, apparatuses, and non-transitory computer-readable medium described herein may further include operations, features, means, or instructions for receiving, from an access and mobility management function (AMF), UE information including one or more of a UE identifier, a UE registration area, or a UE location.

Some examples of the method, apparatuses, and non-transitory computer-readable medium described herein may further include operations, features, means, or instructions for transmitting the approved flight plan to the UE.

In some examples of the method, apparatuses, and non-transitory computer-readable medium described herein, the set of approved flight plan sectors includes a set of contiguous flight plan sectors.

In some examples of the method, apparatuses, and non-transitory computer-readable medium described herein, each flight plan sector of the set of contiguous flight plan sectors includes a volume and a time period corresponding to a duration that the UE may be permitted to occupy the volume.

In some examples of the method, apparatuses, and non-transitory computer-readable medium described herein, each approved flight plan sector of the set of approved flight plan sectors includes one or both of a sector identification or a sector number.

DETAILED DESCRIPTION

Figure 1:
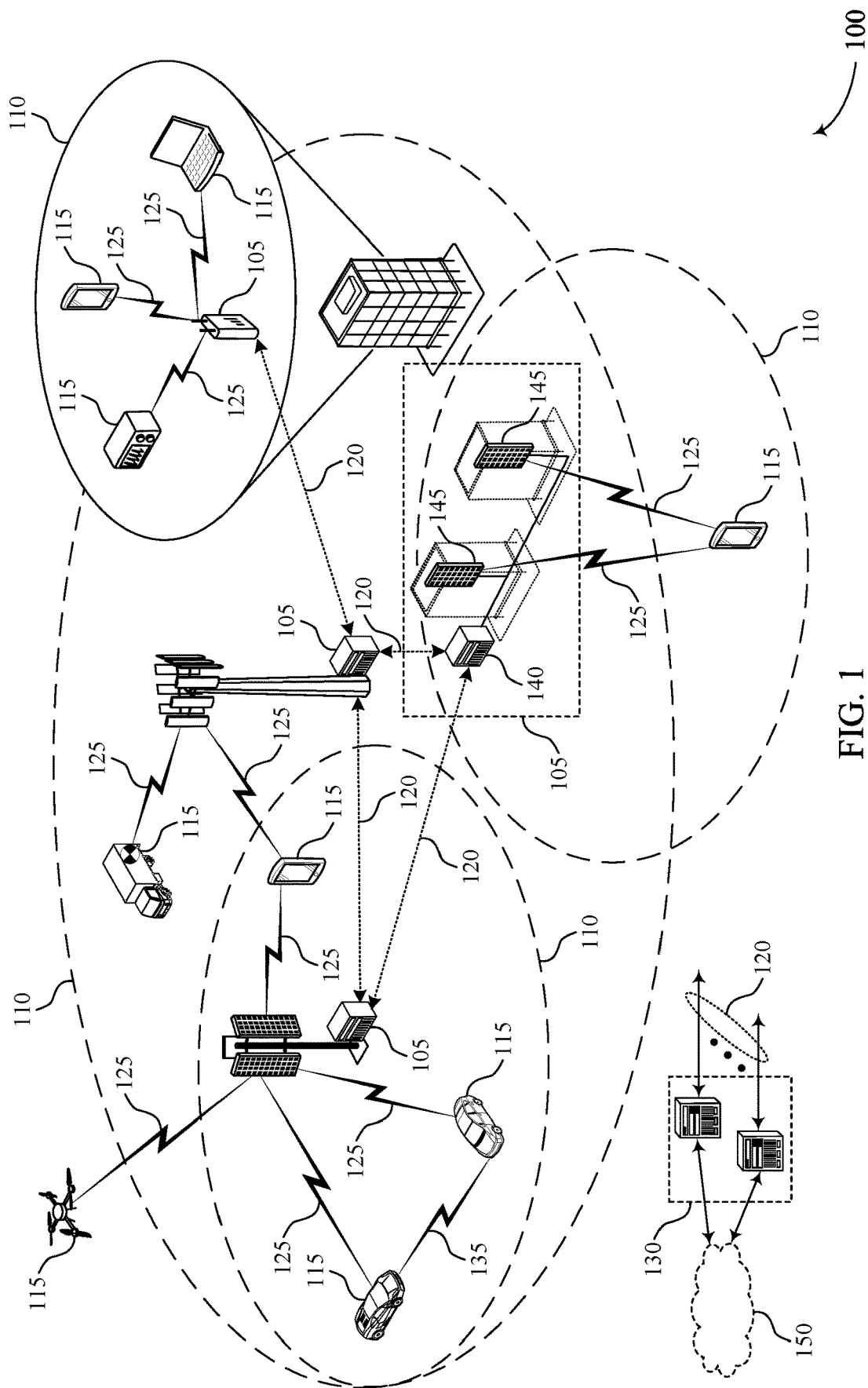
FIG. 1 illustrates an example of a system for wireless communications that supports waypoint based flight declaration signaling in accordance with aspects of the present disclosure.

Wireless communication systems may support communications between a unmanned aerial vehicle (UAV) and a number of components of the wireless communication system while the UAV is traveling throughout a service area of one or more components of the wireless communication system. A UAV may be an example of a user equipment (UE) of the wireless communication system. The wireless communication system may support establishing communications between a UAV and a network node of the wireless communication system.

Knowledge of a flight plan of a UAV may assist a mobile network operator (MNO) in providing support for UAV communications. For example, awareness of a UAV flight plan may be used to assist with handovers by reducing the ping-ponging effect, by enabling the network to more effectively plan radio resource allocation, or by avoiding dropped handovers. Handover planning may involve additional complexity for UAVs because of the increased number of cells that a UAV can potentially communicate with at altitude and because of the relative freedom of the UAV to travel in any direction. There may be additional opportunities to enhance network configuration based on a known trajectory of a UAV, such as resource scheduling, uplink and downlink power levels, quality of service, load balancing, and the like.

However, there may be incompatibilities between how flight plans or paths are characterized by wireless communications systems and by aviation standards or regulatory entities. For example, a wireless communications system may characterize a flight path in terms of three-dimensional waypoints and corresponding times that the UAV expects to be at a waypoint. In contrast, aspects of aviation standards or aviation regulatory entities may utilize a polygon method for flight planning, which includes four-dimensional volumes of space that a define where a UAV may occupy for a particular period of time. These two flight path characterizations may not be directly translatable because they may contain different types of information and may result in network inefficiencies.

In accordance with aspects of the present disclosure, a UAV, components of a wireless communications network, or components of an aviation control network may be configured to translate between a polygon-based flight path and a waypoint-based flight path, for the whole flight path or one or more segments of the flight path, to facilitate communication between a UAV, a wireless communications system, and components of an aviation control system.

For example, a network node may receive a flight declaration approval request from the UAV, forward the request to an unmanned aircraft system (UAS) Traffic Management (collectively UTM) which may generate an approved flight plan which may include one or more approved flight plan sectors based on the flight declaration request, with each sector comprising one or more three dimensional polygons (including three dimensional measurements and coordinates) or four dimensional polygons (including three dimensional measurements and coordinates, and in addition expected transition time for the polygon, e.g. expected time stamps for when the polygon needs to be entered and when it needs to be exited). The UTM may return the approved flight path to the network node, which may then transmit the approved flight plan to the UAV. The network node may also determine a subset of network nodes, based on a mapping between the one or more approved flight plan sectors and one or more of a position of each network node of the subset of network nodes and the location of the UAV, which the network node may have received from the UAV or for which the network node has subscribed via location reporting or management services of the mobile network. The network node may then transmit a node subset flight plan to the subset of the network nodes including the expected positions of the UAV within the one or more approved flight plan sectors, and optionally include a timeframe of reference for when the UAV is expected to enter the sector (e.g. an expected time of entry and an expected time of exit). The UAV may receive a query from one or more network nodes of the subset of network nodes based on a mapping between the one or more approved flight plan sectors and a position of each network node of the subset of network nodes. This query may include a request for one or more waypoints of the UAV within a subset of the one or more approved flight plan sectors, and explicitly contain an indication of the one or more sectors to which the request relates.

In response to the received query, the UAV may determine a flight path that includes the one or more waypoints of the UAV based on the approved flight plan that was received from the network node. The UAV may then respond to the query by transmitting a flight declaration message to the querying network node, the flight declaration message including the determined one or more waypoints corresponding to the one or more sectors that the network node included in the request.

The described techniques include determining waypoints of the UAV along an approved UAV flight path so that the UAV may communicate one or more of its current position and its expected position(s) within one or more flight plan sectors as it traverses through one or more coverage areas of one or more network nodes. The waypoints may be four-dimensional waypoints—that is they may include three dimensional coordinate locations and a time dimension corresponding to a time that the UAV will pass through the three dimensional coordinate location. The time may include a minimum expected entry time and a maximum expected exit time. These waypoints may be calculated by the UAV based on various factors which may include a trajectory of the UAV or one or more factors external to the UAV such as ambient weather conditions, anticipated traffic, prevailing winds, expected ground speed versus actual ground speed, etc. The expected positions of the UAV may be continuously updated by the UAV based on a monitoring of the conditions and progress of the UAV by the UAV, or based on cooperation with one or more network nodes. Such tracking and prediction of the UAV position facilitates efficient routing of traffic and collision avoidance techniques for UAVs and other types of aircraft.

The described techniques further include generating an approved flight plan for a UAV that includes specifics related to which polygonal spaces, or flight plan sectors, that the UAV is cleared to traverse through as well as time periods during which the UAV may traverse the approved flight plan sectors. A subset of network nodes are determined based on a mapping between the approved flight plan for the UAV and positions of network nodes that lie within a predetermined proximity of the approved flight plan such that communications between one or more network nodes and the UAV may be maintained throughout the UAVs journey along the approved flight plan. Once network nodes that are in positions relevant to the UAVs flight plan are determined, a node subset flight plan, which is a subset of the approved flight plan relevant to the set of nodes based on their position, is transmitted to the relevant nodes. The network nodes of this subset may begin querying the UAV in order to receive the above-discussed waypoints from the UAV and to further facilitate determination of the UAV's position and smooth and efficient hand-offs between the various network nodes.

Aspects of the disclosure are initially described in the context of wireless communications systems. Additional aspects are described with reference to systems that support waypoint based flight declaration signaling. Aspects of the disclosure are further illustrated by and described with reference to apparatus diagrams, system diagrams, and flowcharts that relate to waypoint based flight declaration signaling.

FIG. 1 illustrates an example of a wireless communications system 100 that supports waypoint based flight declaration signaling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. Components within a wireless communication system may be coupled (for example, operatively, communicatively, functionally, electronically, and/or electrically) to each other.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. In some examples, a UE 115 may be an UAV or other type of aerial vehicle or drone. A UE 115 may also include or may be referred to as a personal electronic device such as a cellular phone, a personal digital assistant (PDA), a multimedia/entertainment device (e.g., a radio, a MP3 player, a video device, etc.), a camera, a gaming device, a navigation/positioning device (e.g., GNSS (global navigation satellite system) devices based on, for example, GPS (global positioning system), Beidou, GLONASS, or Galileo, a terrestrial-based device, etc.), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques are described herein to support waypoint based flight declaration signaling. The techniques provide for establishing and supporting communications between a UE, or UAV, and a number of components of the wireless communication system while the UAV is traveling throughout a service area of one or more components of the wireless communication system. For example, the wireless communication system may support establishing communications between a UAV and a network node of the wireless communication system. The network node may receive a flight declaration request from the UAV and may generate an approved flight plan which may include one or more approved flight plan sectors based at least in part on the flight declaration request. The network node may then transmit the approved flight plan to the UAV.

The network node may also determine a subset of network nodes, based at least in part on a mapping between the one or more approved flight plan sectors and a position of each network node of the subset of network nodes. The network node may then transmit a node subset flight plan to the subset of the network nodes including the expected positions of the UAV within the one or more approved flight plan sectors. The UAV may receive a query from one or more network nodes of the subset of network nodes based on a mapping between the one or more approved flight plan sectors and a position of each network node of the subset of network nodes. This query may include a request for one or more waypoints of the UAV within a subset of the one or more approved flight plan sectors.

The system 100, including the cloud platform 115, may support waypoint based flight declaration signaling between one or more user devices, or UAVs, such as the user devices 115. For example, a UE 115 may communicate with one or more of the base stations 105 via one or more of the communication links 125 to determine a position of the UE 115 and to determine expected positions of the UE 115 corresponding to waypoints of the UE that were determined as part of determining the flight path of the UE 115.

The described techniques include determining waypoints of the UAV along a UAV flight path so that the UAV may communicate both its current position and its expected position(s) within one or more flight plan sectors as it traverses through one or more coverage areas of one or more network nodes. The waypoints may be four-dimensional waypoints—that is they may include three dimensional coordinate locations and a time dimension corresponding to a time that the UAV will pass through the three dimensional coordinate location. These waypoints may be calculated by the UAV based on various factors which may include a trajectory of the UAV or one or more factors external to the UAV such as ambient weather conditions, anticipated traffic, prevailing winds, etc. The expected positions of the UAV may be continuously updated by the UAV based on a monitoring of the conditions and progress of the UAV by the UAV, or based on cooperation with one or more network nodes. Such tracking and prediction of the UAV position facilitates efficient routing of traffic and collision avoidance techniques for UAVs and other types of aircraft.

The described techniques further include generating an approved flight plan for a UAV that includes specifics related to which polygonal spaces, or flight plan sectors, that the UAV is cleared to traverse through as well as time periods during which the UAV may traverse the approved flight plan sectors. A subset of network nodes are determined based on a mapping between the approved flight plan for the UAV and positions of network nodes that lie within a predetermined proximity of the approved flight plan such that communications between one or more network nodes and the UAV may be maintained throughout the UAVs journey along the approved flight plan. Once network nodes that are in positions relevant to the UAVs flight plan are determined, a node subset flight plan is transmitted to the relevant nodes and the network nodes of this subset may begin querying the UAV in order to receive the above-discussed waypoints from the UAV and to further facilitate determination of the UAV's position and smooth and efficient hand-offs between the various network nodes.

Figure 2:
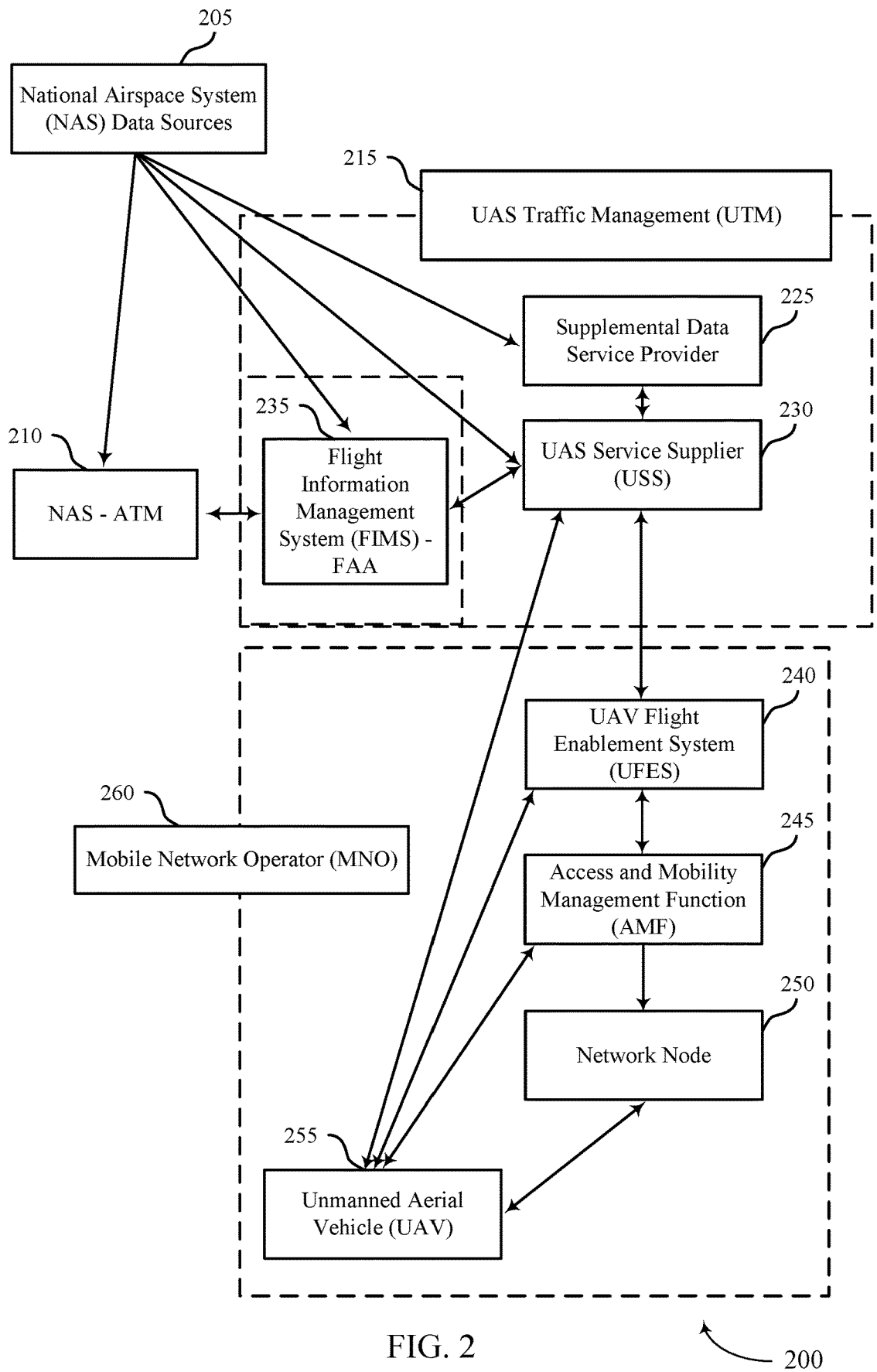
FIG. 2 illustrates an example of a system that supports waypoint based flight declaration signaling in accordance with aspects of the present disclosure.

FIG. 2 illustrates an example of a system 200 that supports waypoint based flight declaration signaling in accordance with aspects of the present disclosure. In some examples, the system 200 may implement aspects of wireless communication system 100. The system 200, which may be an example of a system for communications between one or more devices, includes one or more National Airspace System (NAS) data sources 205, a NAS ATM 210, and an unmanned aircraft system (UAS) Traffic Management (collectively UTM) system 215.

The UTM system 215 includes a supplemental data service provider 225, a UAS service supplier (USS) 230, and a UAV flight enablement system (UFES) 240. The mobile network operator (MNO) 260 may include or otherwise control an access and mobility management function (AMF) 245, a network node 250, and an unmanned aerial vehicle (UAV) 255. Additionally, a flight information management system (FIMS) may be within the UTM system 215 framework but functions separately and distinctly from the UTM system 215 as part of an FAA system. In some cases, the UAV 255 may be a UE 255.

The NAS data sources 205 may transmit relevant data to each of the NAS-ATM 210, the FIMS 235, the USS 230, and the supplemental data service provider 225. Additionally, the NAS-ATM 210 and the FIMS-FAA 235 may communicate with each other. The FIMS-FAA 235 and the USS 230 may communicate with each other, as may the supplemental data service provider 225 and the USS 230. The USS 230 and the UFES 240 may communicate with each other. The UFES 240 and the AMF 245 may communication with each other. Additionally, the network node 250 may receive transmissions from the AMF 245 and the AMF 245 may receive transmissions from the UAV 255. Further, the network node 250 and the UAV 255 may communicate with each other. Additionally, the UAV 255 may communicate directly or indirectly with the UFES 240 and the USS 230.

As described in more detail with reference to FIGS. 3 and 4, the flight of UAV 255 under monitoring and coordination of the UTM 215 system may be based on flight plan authorization by the USS 230. In some cases, the USS 230 provides an authorized flight path using a polygon-based model to a wireless communication system. For example, aspects of the wireless communications system (e.g., a wireless communications system 100, which may include a core network, AMF 245, and/or network node 250) may obtain an approved flight path associated with UAV 255 from the USS 230. This process may occur during a USS-specific authentication and authorization (USAA) procedure in which the MNO requests authorization for the UAV operations using MNO connectivity to the USS; or upon a specific flight authorization procedure in which the UAV requests authorization of a flight plan to the USS 230. The core network (or other aspects of the wireless communications system) may deliver the approved UAV flight path to RAN components upon flight authorization upon USAA process, and may update it at any time (e.g., when the core network receives a new approved UAV flight plan from the USS). The UAV 255 may distill a waypoint-based flight path declaration from the polygon-based flight path and send the waypoint-based flight path to the RAN. The RAN (e.g., via network node 250) may request waypoint information for specific sectors of the approved flight plan. The UAV 255 may report a flight declaration for the current polygon or the requested sector, which may assist the RAN in performing handover and coverage planning within the current polygon and for the transition from the current polygon to the next. The RAN may compare the information provided by the UAV 255 with the information received from the core network to verify correctness. The RAN may receive the exact approved polygon-based flight path from the core network and use the information from the UAV 255 for handover planning.

Figure 3:
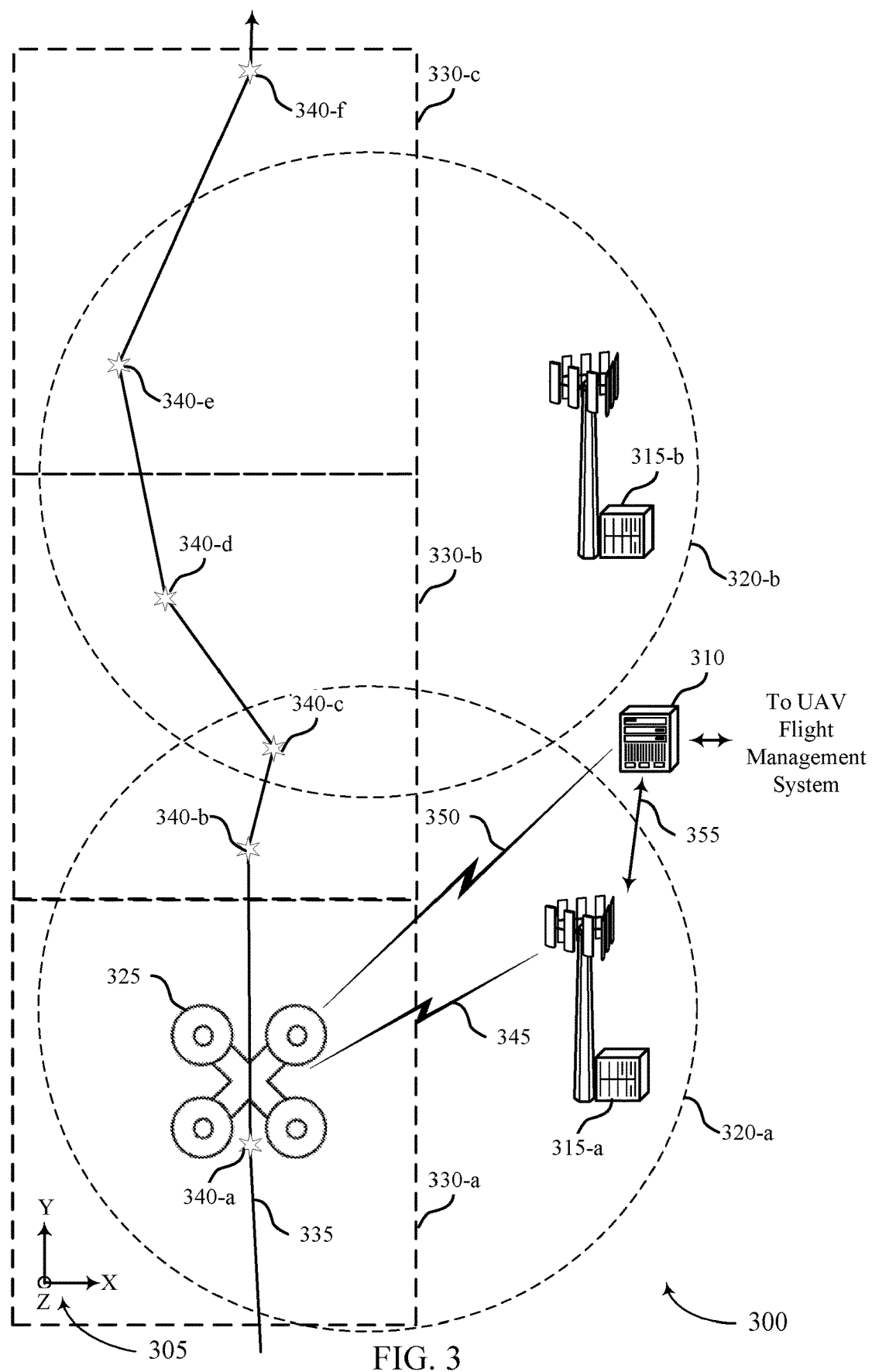
FIG. 3 illustrates an example of a system that supports waypoint based flight declaration signaling in accordance with aspects of the present disclosure.

FIG. 3 illustrates an example of a system 300 that supports waypoint based flight declaration signaling in accordance with aspects of the present disclosure. In some examples, the system 300 may implement aspects of wireless communication system 100 or the system 200. The system 300, which may be an example of a system for communications between one or more devices or network nodes, includes an AMF 310, a first base station 315-a, a second base station 315-b, and a UAV 325. In some examples, the UAV 325 may be a UE 325 and each of the base stations 315 may be a network node 315.

Each of the base stations 315 includes a coverage area 320. More specifically, the base station 315-a includes a coverage area 320-a and the base station 315-b includes a coverage area 320-b, each coverage area 320 representing a physical volume within which the relevant base station 315 may communicate with one or more UAVs 325. As illustrated in FIG. 3, three contiguous flight plan sectors 330: flight plan sector 330-a, flight plan sector 330-b, and flight plan sector 330-c, extend along an X-axis and a Y-axis of coordinate system 305 in an end-to-end arrangement. Additionally, each of the flight plan sectors 330 extends vertically along the Z axis of the coordinate system 305 such that each of the flight plan sectors 330 represents a volume.

A flight path 335 is illustrated as extending through each of the flight plan sectors 330 and includes a plurality of waypoints 340 including waypoint 340-a, waypoint 340-b, waypoint 340-c, waypoint 340-d, waypoint 340-e, and waypoint 340-f. The waypoints 340-a, 340-b, and 340-c are positioned within the coverage area 320-a of the base station 315-a, and the waypoints 340-c, 340-d, 340-e are positioned within the coverage area 320-b of the base station 315-b. In the present example, the flight path 335 is illustrated as a curvilinear flight path 335 with respect to the X and Y dimensions. Additionally, the flight path 335 may be curvilinear in the Z dimension. In some cases, the flight path 335 may be a straight line, or any other type of flight path 335 that facilitates operation of the UAV 325 within the flight sectors 330 as described herein.

Each of the flight plan sectors 330 represents a polygonal volume occupying a three dimensional space defined by the coordinate system 305 and existing for a predetermined period of time. Such a predetermined period of time may be determined by one or more components of the systems 300, 200, or 100 as described herein.

Each of the waypoints 340 represents a four-dimensional (4D) coordinate. More specifically, each of the waypoints 340 defines a point in space within one of the flight plan sectors 330 that has an X-axis value, a Y-axis value, and a Z-axis value, as well as time value. Accordingly, each of the waypoints 340 may be determined by the UAV 325 in response to receiving a query from one or more of the base stations 315-a and represents an estimated position of the UAV 325 along the flight path 335 within a respective one of the flight plan sectors 330 at a specific time. Such a determination by the UAV 325 may facilitate coordination by one or more of the base stations 315, or additional devices, of additional UAV 325 traffic within one or more of the flight plan sectors 330.

The UAV 325 may be configured to determine a flight path declaration based on the waypoints 340 and the polygon-based flight path 335 and may additionally transmit such a flight path declaration to one or both of the base stations 315. One or both of the base stations 315 may transmit a query to the UAV 325 requesting position information from the UAV 325. This query may include a request for one or more waypoints of the UAV within a subset of the one or more approved flight plan sectors, and may explicitly contain an indication of the one or more sectors to which the query relates. Such a request to the UAV 325 may trigger the UAV 325 to transmit the requested information, such as one or more determined waypoints 340, based on the flight plan sector 330 currently occupied by the UAV 325. Additionally, the information transmitted to the one or more base stations 315 in response to the received query may be based on a requested flight plan sector 330, an expected flight plan sectors 330 to be next occupied by the UAV 325, or to facilitate efficient transition of the UAV 325 throughout the flight plan sectors 330 and to adjoining coverage areas 320.

The base stations 315 may compare information received from the UAV 325 via the communication link 345 with information received from the AMF 310 with the communication link 355 to corroborate the information received from the UAV 325. Such information may include the waypoints 340 or any other additional position information relevant to determining and planning for the UAV 325 to pass through a corresponding coverage area 320. Additionally, information received by one of the base stations 315 from the UAV 325 may be shared with one or more additional base stations 315 via a direct communication connection between the base stations 315 or via an intermediate relay component, such as the AMF 310.

The base stations 315 may communicate with the UAV 325 when the UAV 325 is located within the respective coverage areas 320 of the base stations 315. For example, while the UAV 325 is traveling along the flight path 335, the UAV 325 may communicate with the base station 315-*a* while within the coverage area 320-*a* via a base station communication link 345. In some examples, the base station communication link 345 may include RRC signaling. Additionally, when the UAV 325 is within the overlapping coverage areas 320 associated with both the base station 315-*a* and the base station 315-*b*, the UAV 325 may communicate with either or both of the base station 315-*a* and the base station 315-*b*. For example, when the UAV 325 is positioned at the waypoint 340-*c*, the UAV 325 may communicate with one or both of the base stations 315-*a* and 315-*b*. Accordingly, as the UAV 325 travels along the flight path the UAV 325 may be solely within the coverage area 320-*b* and may communicate with the base station 315-*b*.

The RCC signaling between the UAV 325 and the base station stations 315 may be initiated by the base station 315, which may transmit a UAV information request message to the UAV 325. Transmission of the UAV information request message may follow confirmation of a successful security activation between the UAV 325 and the relevant base station 315. Following confirmation of the successful security activation by the UAV 325, and if flight path 335 is available to the UAV 325, the UAV 325 may create a flight path info report. The flight path info report may include one or more of the waypoints 340 and may include time stamps, each time stamp associated with a corresponding one of the waypoints 340 and representing a time at which the UAV 325 expects to be present at the associated waypoint 340.

Additionally, as part of the RRC signaling between the UAV 325 and one or more of the base stations 315, the RRC signaling from the one or more base stations 315 to the UAV 325 may include a flight path information report configuration. Such a configuration may notify the UAV 325 of the information to include in the flight path information report, which may be based on the capabilities of the base station 315 to which the flight path information report may be transmitted. The configuration may include one or more flight path sector identifiers which identify one or more flight path sectors 330 associated with the flight path 335. The configuration may further include an indication indicating a maximum number of waypoints 340 which may be included as part of the flight path information report, assuming the waypoint information is available for use by the UAV 325. Additionally, the configuration may include an indication indicating to the UAV 325 whether a time reference associated with each of the waypoints 340 may be included in the flight path information report. The time reference may be a single time stamp, or a minimum expected arrival time stamp and maximum expected arrival time stamp.

The AMF 310 may communicate with the UAV 325 via the communication link 350 and with the base station 315-*a* via the communication link 355. The UAV 325 may request approval for a flight declaration via the communication link with the AMF 310, which may then relay the flight declaration request to additional upstream components of the system 300 as described herein with reference to systems 100 and 200. The AMF 310 may also transmit information related to approved UAV 325 flight plans to the base station 315-*a* via the communication link 355, which may also extend between the AMF 310 and the base station 315-*b*.

Figure 4:
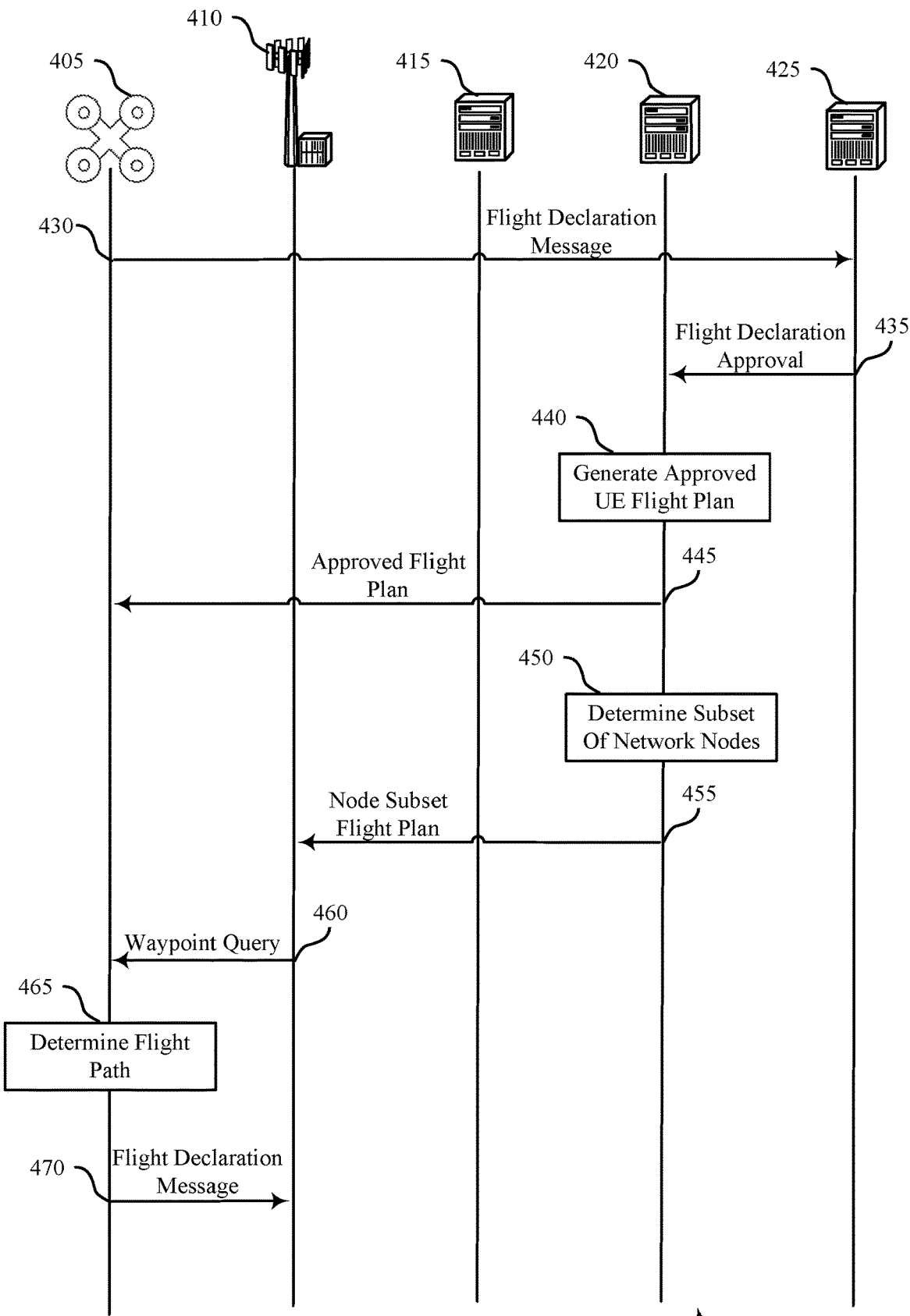
FIG. 4 illustrates an example of a process flow that supports waypoint based flight declaration signaling in accordance with aspects of the present disclosure.

FIG. 4 illustrates an example of a process flow 400 that supports waypoint based flight declaration signaling in accordance with aspects of the present disclosure. In some examples, the process flow 400 may implement aspects of wireless communication system 100. The process flow 400 includes a UAV 405, a network node 410, an access and mobility management function (AMF) 415, a UAV Flight Enablement System (UFES) 420, and a UE Service Supplier (USS) 425. In some cases, one or more of the AMF 415, the UFES 420, or the USS 425 may be network nodes. In some examples, the UAV 405 may be an example of a UE. Alternative examples of the following may be implemented, where some steps are performed in a different order than described, or not performed at all. In some cases, steps may include additional features not mentioned below, or further steps may be added.

The UAV 405 may initially perform a registration process with the USS 425, which may involve exchange of identity information, registration information, security information, and the like. The UAV 405 may similarly perform a registration process with a wireless communications network (e.g., such as wireless communications network 100 as described with reference to FIG. 1), which may include components such as the network node 410, the AMF 415, the UFES 420, and the USS 425. The UFES 420 may request location information of the UAV 405, and the AMF 415 may report location information of the UAV 405 such as a registration area, a cell identifier, or the like.

The UAV 405 may perform a flight declaration authorization procedure. As part of this procedure, at 430, a flight declaration message may be transmitted from the UAV 405 to the USS 425 via the UFES 420. This flight declaration message may request approval for a flight declaration (e.g., a ReqFlightPlan message). Additionally or alternatively, the UAV 405 may send the flight declaration message to the AMF 415 (e.g., in Non-Access Stratum signaling such as a NAS Transport message request), and the AMF 415 may send the flight declaration message to the UFES 420. Alternatively, the UAV 405 may send the flight declaration message directly to the UFES 420 using user plane connectivity (e.g., a PDU session in a 5G system or a PDN connection in a 4G system). In some examples, the UAV 405 may use NAS signaling with a Session Management Function (SMF) to provide the flight declaration message to the SMF, which routes the message to the UFES 420.

At 435, following receipt of the flight declaration message by the USS 425, a flight declaration approval may be transmitted from the USS 425 to the UFES 420.

At 440, the UFES 420 may generate, for the UAV 405, an approved flight plan. For example, the UFES 420 may convert an approved flight plan to approved flight plan sectors. That is, the approved flight plan may include one or more approved flight plan sectors based at least in part on the flight declaration message. In some cases, the one or more approved flight plan sectors may include one or more contiguous flight plan sectors. In some examples, each flight plan sector of the one or more contiguous flight plan sectors includes a volume and a time period that corresponds to a duration that the UAV 405 is permitted to occupy the volume. In some examples, each approved flight plan sector of the one or more approved flight plan sectors includes one or both of a sector identification or a sector number. In some examples, the approved flight plan sectors are defined by the UFES 420 based on geographical locations defined in the flight declaration approval and corresponding to specific locations of network nodes 410.

At 445, the UFES 420 may transmit an approved flight plan to the UAV 405. This message may be in the form of an approval for flight declaration (e.g., an ApprovedFlightPlan message). In some examples, the approved flight plan may be sent directly from the UFES 420 to the UAV 405. Additionally or alternatively, the approved flight plan may be sent to the UAV 405 via the AMF 415 (if the initial flight declaration request message was routed via the AMF 415). In some other examples, the approved flight plan may be transmitted to the UAV 405 via an SMF (if the initial flight declaration request message was routed via the SMF).

At 450, the UFES 420 may determine a subset of network nodes, which may include the network node 410. The determination may be based at least in part on a mapping between the one or more approved flight plan sectors and one or more of a position of each network node of the subset of network nodes. In some cases, determining the subset of nodes may include calculating the expected positions of the UAV 405 within a subset of the one or more approved flight plan sectors based at least in part on the position and coverage area of the subset of the network nodes.

At 455, the UFES 420 may transmit a node subset flight plan to a RAN component and/or to the network node 410. In some examples, the node subset flight plan may include the expected positions of the UAV 405 within a coverage area of the subset of the network nodes, such as the network node 410. A RAN component may identifier a current sector or polygon from the node subset flight plan based on a location of the UAV 405 (e.g., based on a cell identifier or an actual geographic location of the UAV 405, including altitude, that the UAV 405 may be reporting in access stratum signaling). In some examples, the one or more of the UFES 420, the network node 410, or the USS 425 may receive from the AMF 415 UE information that includes one or more of a UE identifier, a UE registration area, or a UE location.

At 460, the network node 410 may transmit a waypoint query to the UAV 405, which may be referred to as a UEInformationRequest message. The network node 410 sending the request may be a network node 410 currently serving the UAV 405, but may be a different network node (e.g., a network node not currently serving the UAV 405). The waypoint query may request flight information for a particular sector or a number of sectors. The waypoint query may be based at least in part on a mapping between the one or more approved flight plan sectors and a position of each network node of the subset of network nodes, such as the network node 410. Additionally, the query may include a request for a plurality of waypoints of the UAV 405 within a subset of the one or more approved flight plan sectors.

At 465, and in response to receiving the waypoint query from the network node 410, the UAV 405 may determine a flight path for the sector or sectors included in the waypoint query. In some cases, the flight path may include the one or more waypoints of the UAV 405 based at least in part on the received approved flight plan. In some cases, determining the flight path may include calculating the one or more waypoints based at least in part on a trajectory the UAV 405 within a sector, the one or more factors external to the UAV 405, or both. In some examples, the received query may indicate a maximum number of waypoints for inclusion in the flight declaration message. In some examples, receiving the query from the network node 410 includes receiving the query from the network node 410 via RRC signaling.

In some cases, receiving the query from the network node 410 may include receiving one or more queries from one or more network nodes, including the network node 410, of network nodes. In some embodiments, each of the one or more waypoints may include an expected three dimensional position of the UAV 405 that corresponds to the waypoint within a corresponding one of the one or more approved flight plan sectors. In other cases, each of the one or more waypoints may include a timestamp that corresponds to an expected arrival of the UAV 405 at the expected three dimensional position that corresponds to the waypoint.

At 470, the UAV 405 may transmit a flight declaration message to the network node 410. In such cases, the flight declaration message may include the determined one or more waypoints.

Figure 5:
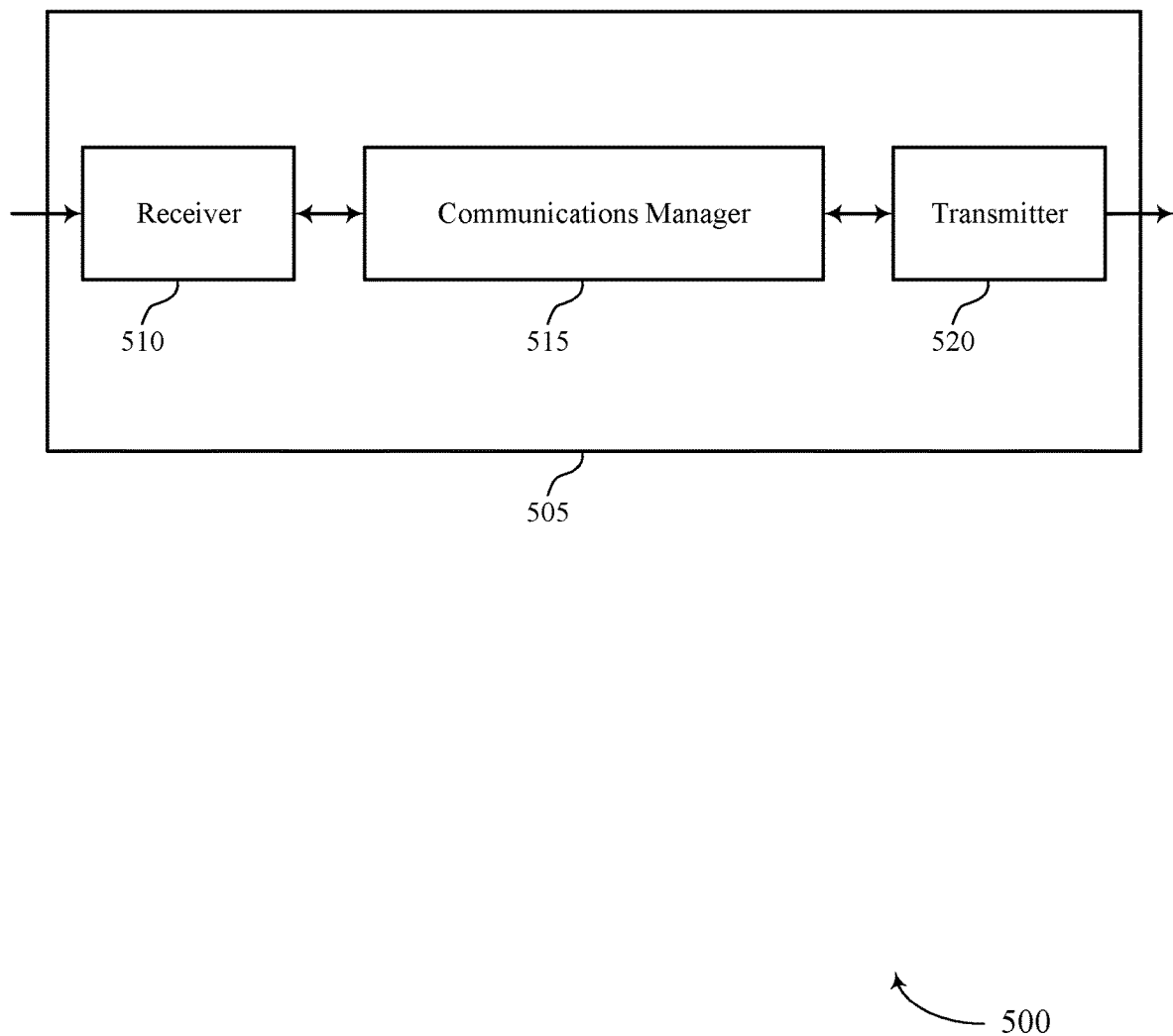
FIGS. 5 and 6 show block diagrams of devices that support waypoint based flight declaration signaling in accordance with aspects of the present disclosure.

FIG. 5 shows a block diagram 500 of a device 505 that supports waypoint based flight declaration signaling in accordance with aspects of the present disclosure. The device 505 may be an example of aspects of a UE 115 (e.g., a UAV) as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to waypoint based flight declaration signaling, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive an approved flight plan including a set of approved flight plan sectors, receive a query from a network node, the query including an indication of a subset of the set of approved flight plan sectors and a request for a set of waypoints of the UE within the indicated subset of the set of approved flight plan sectors, determine, in response to receiving the query from the network node, a flight path including the set of waypoints of the UE for the indicated subset of the set of approved flight plan sectors based on the received approved flight plan, and transmit, to the network node, a flight declaration message including the determined set of waypoints. The communications manager 515 may be an example of aspects of the communications manager 810 described herein.

The communications manager 515, or its sub-components, may be implemented in hardware, software (e.g., executed by a processor), or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
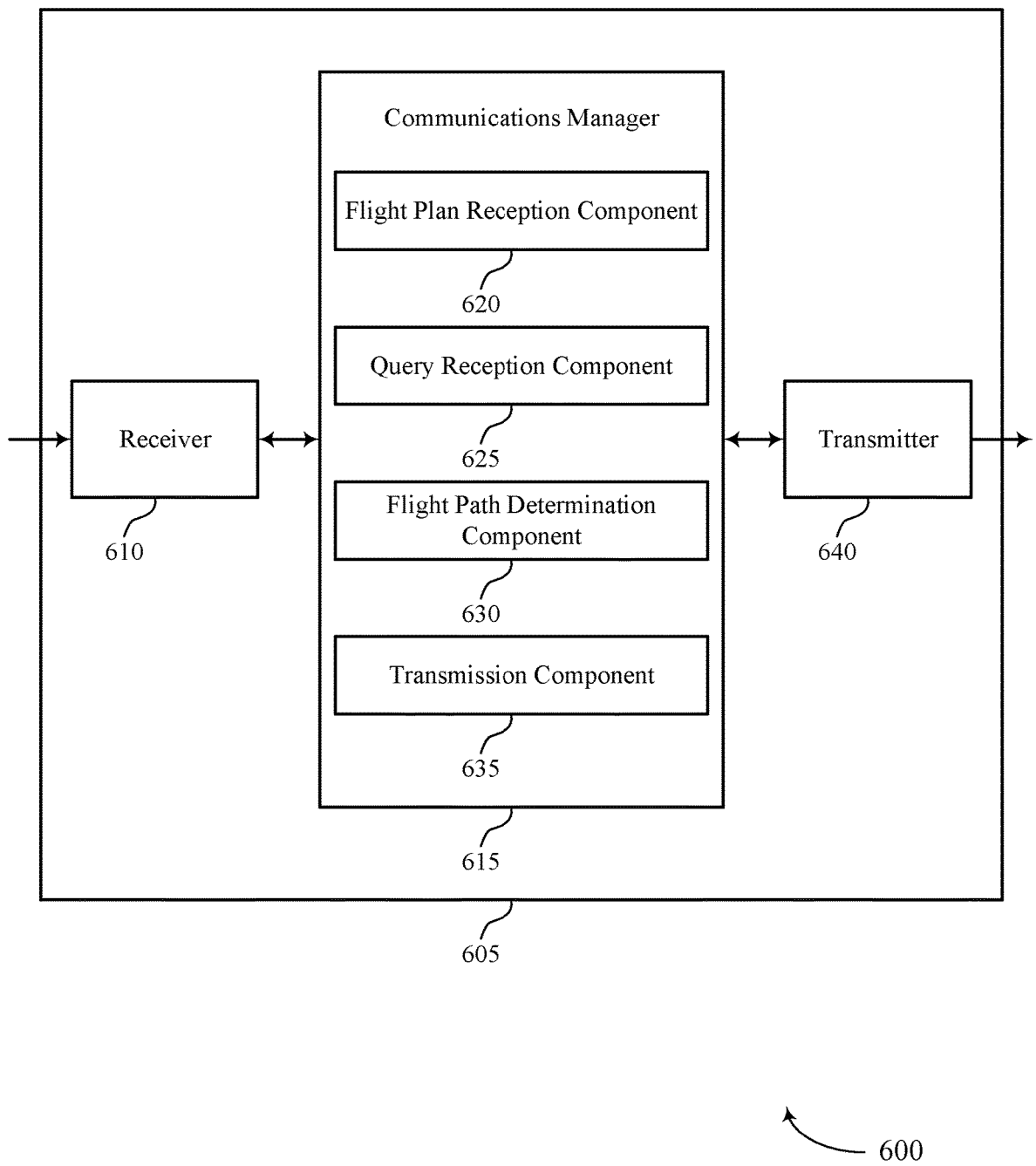

FIG. 6 shows a block diagram 600 of a device 605 that supports waypoint based flight declaration signaling in accordance with aspects of the present disclosure. The device 605 may be an example of aspects of a device 505, or a UE 115 (e.g., a UAV) as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to waypoint based flight declaration signaling, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a flight plan reception component 620, a query reception component 625, a flight path determination component 630, and a transmission component 635. The communications manager 615 may be an example of aspects of the communications manager 810 described herein.

The flight plan reception component 620 may receive an approved flight plan including a set of approved flight plan sectors.

The query reception component 625 may receive a query from a network node, the query including an indication of a subset of the set of approved flight plan sectors and a request for a set of waypoints of the UE within the indicated subset of the set of approved flight plan sectors.

The flight path determination component 630 may determine, in response to receiving the query from the network node, a flight path including the set of waypoints of the UE for the indicated subset of the set of approved flight plan sectors based on the received approved flight plan.

The transmission component 635 may transmit, to the network node, a flight declaration message including the determined set of waypoints.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
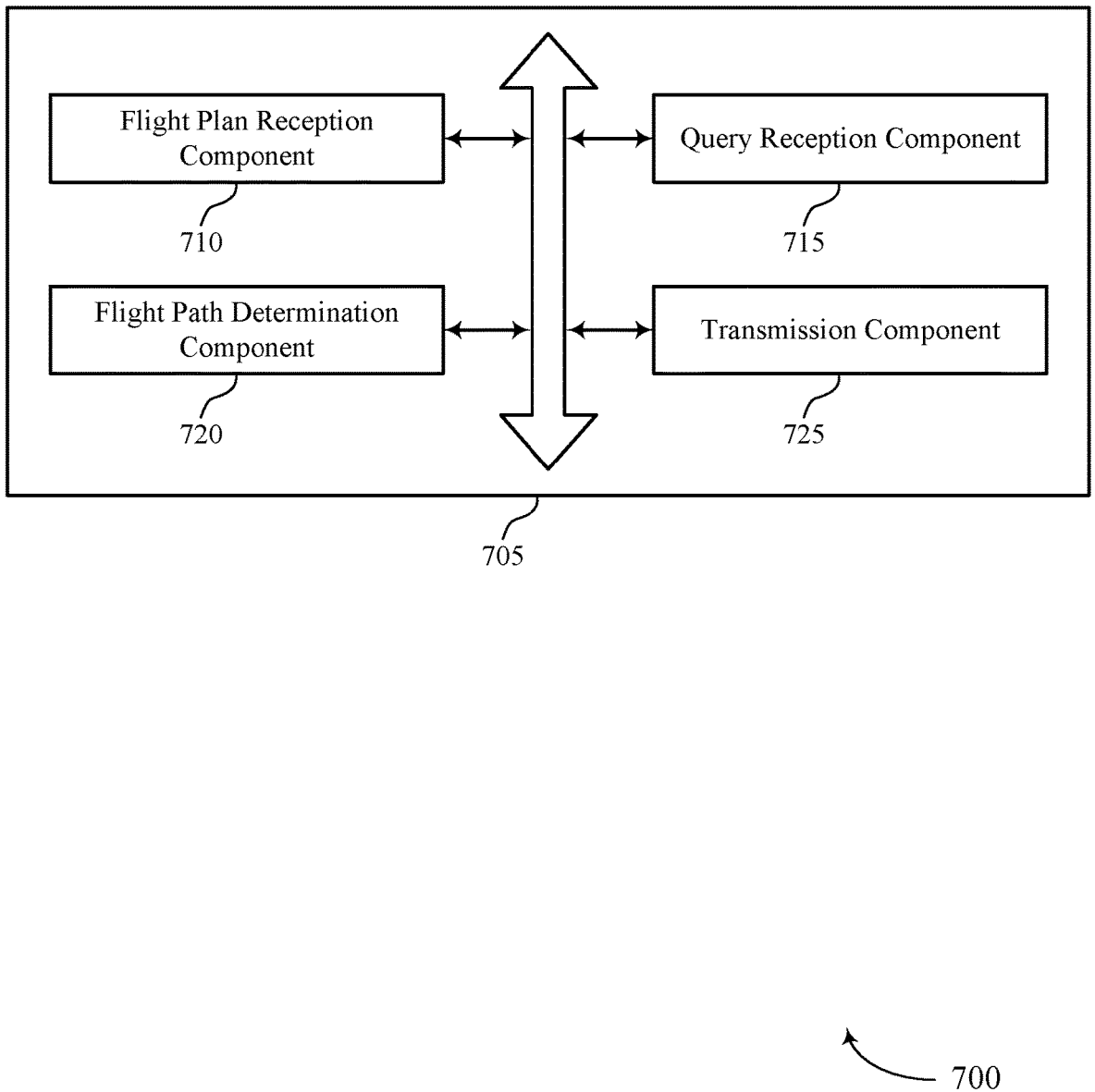
FIG. 7 shows a block diagram of a communications manager that supports waypoint based flight declaration signaling in accordance with aspects of the present disclosure.

FIG. 7 shows a block diagram 700 of a communications manager 705 that supports waypoint based flight declaration signaling in accordance with aspects of the present disclosure. The communications manager 705 may be an example of aspects of a communications manager 515, a communications manager 615, or a communications manager 810 described herein. The communications manager 705 may include a flight plan reception component 710, a query reception component 715, a flight path determination component 720, and a transmission component 725. Each of these modules may communicate, directly or indirectly, with one another (e.g., via one or more buses).

The flight plan reception component 710 may receive an approved flight plan including a set of approved flight plan sectors.

In some cases, the set of approved flight plan sectors includes a set of contiguous flight plan sectors.

In some cases, each flight plan sector of the set of contiguous flight plan sectors includes a volume and a time period corresponding to a duration that the UE is permitted to occupy the volume.

In some cases, each approved flight plan sector of the set of approved flight plan sectors includes one or both of a sector identification or a sector number.

The query reception component 715 may receive a query from a network node, the query including an indication of a subset of the set of approved flight plan sectors and a request for a set of waypoints of the UE within the indicated subset of the set of approved flight plan sectors.

In some examples, the query reception component 715 may receive the query from the network node via RRC signaling.

In some examples, the query reception component 715 may receive a set of queries from a set of network nodes.

In some cases, the received query indicates a minimum, a maximum, or both, of number of waypoints for inclusion in the flight declaration message.

The flight path determination component 720 may determine, in response to receiving the query from the network node, a flight path including the set of waypoints of the UE for the indicated subset of the set of approved flight plan sectors based on the received approved flight plan.

In some examples, the flight path determination component 720 may calculate the set of waypoints based on a trajectory of the UE, one or more factors external to the UE, or both.

In some cases, each of the set of waypoints includes an expected three dimensional position of the UE corresponding to the waypoint within a corresponding one of the subset of the set of approved flight plan sectors.

In some cases, each of the set of waypoints further includes a timestamp indicating a minimum expected entry time and a maximum expected exit time of the UE corresponding to the expected three dimensional position corresponding to the waypoint.

The transmission component 725 may transmit, to the network node, a flight declaration message including the determined set of waypoints.

Figure 8:
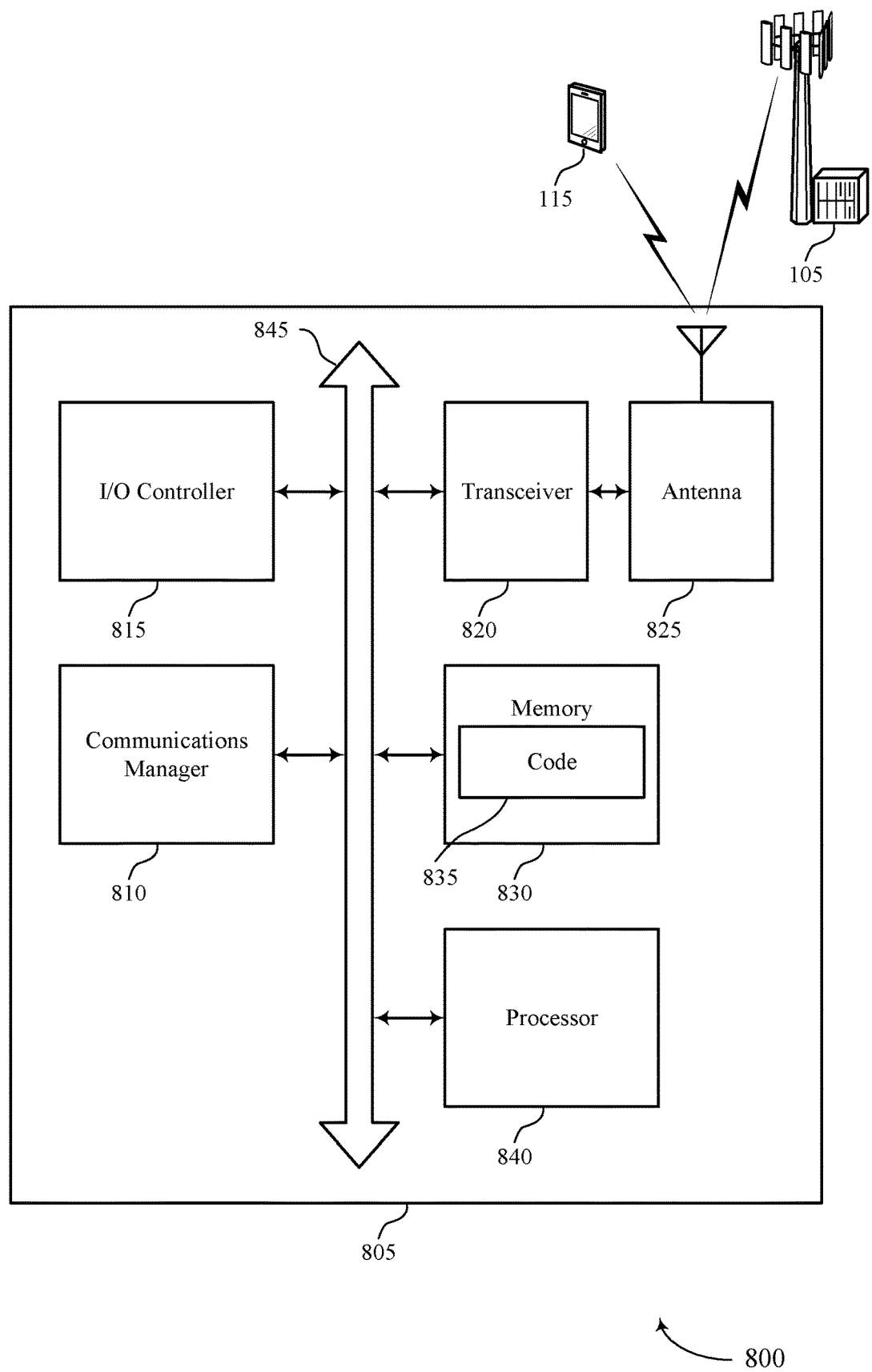
FIG. 8 shows a diagram of a system including a device that supports waypoint based flight declaration signaling in accordance with aspects of the present disclosure.

FIG. 8 shows a diagram of a system 800 including a device 805 that supports waypoint based flight declaration signaling in accordance with aspects of the present disclosure. The device 805 may be an example of or include the components of device 505, device 605, or a UE 115 (e.g., a UAV) as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive an approved flight plan including a set of approved flight plan sectors, receive a query from a network node, the query including an indication of a subset of the set of approved flight plan sectors and a request for a set of waypoints of the UE within the indicated subset of the set of approved flight plan sectors, determine, in response to receiving the query from the network node, a flight path including the set of waypoints of the UE for the indicated subset of the set of approved flight plan sectors based on the received approved flight plan, and transmit, to the network node, a flight declaration message including the determined set of waypoints.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting waypoint based flight declaration signaling).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
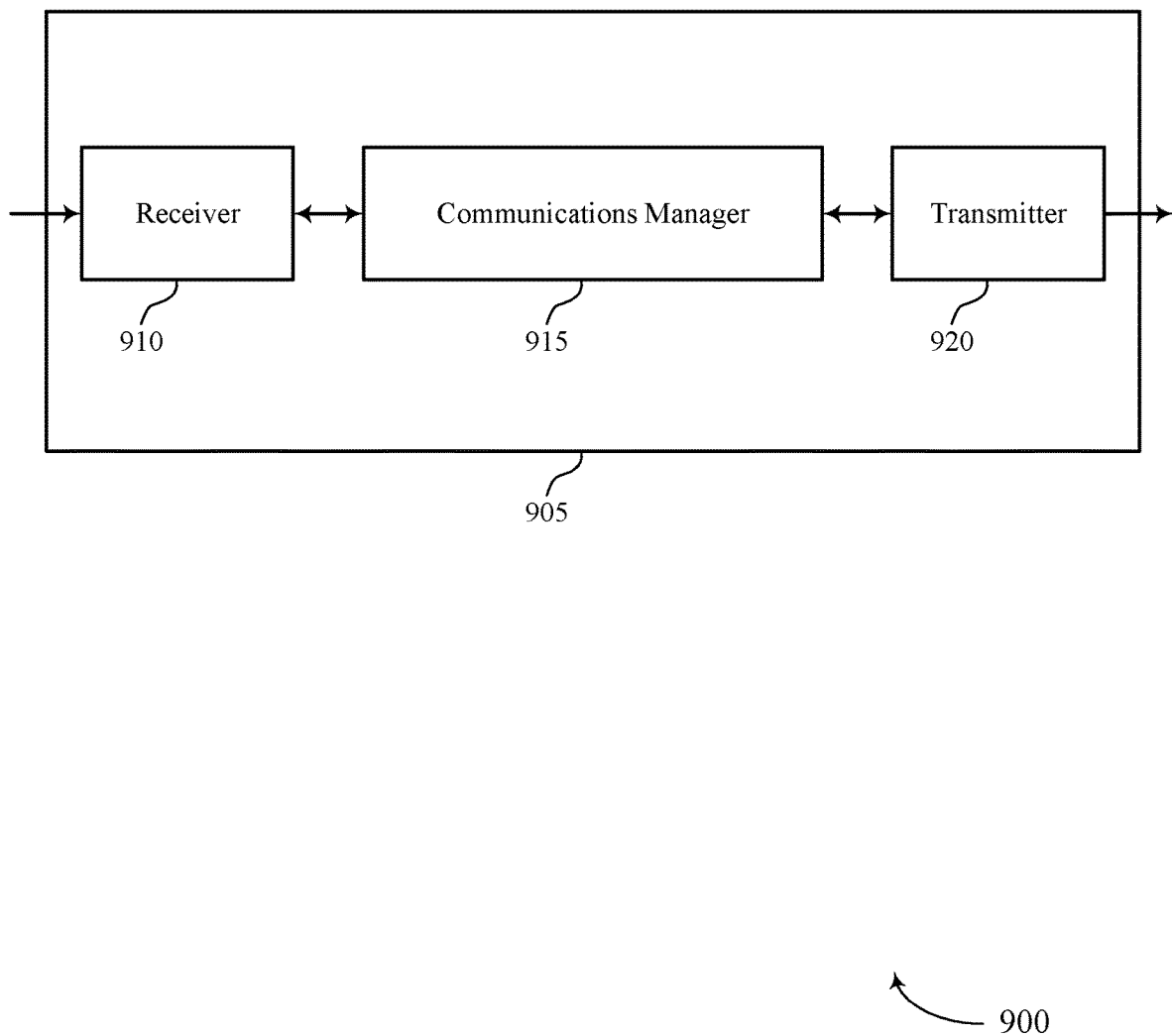
FIGS. 9 and 10 show block diagrams of devices that support waypoint based flight declaration signaling in accordance with aspects of the present disclosure.

FIG. 9 shows a block diagram 900 of a device 905 that supports waypoint based flight declaration signaling in accordance with aspects of the present disclosure. The device 905 may be an example of aspects of a network node or its components as described herein (e.g., a base station, a UFES, a USS, an AMF or a SMF). The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to waypoint based flight declaration signaling, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a flight declaration request from a UE, generate, for the UE, an approved flight plan including a set of approved flight plan sectors based on the flight declaration request, determine a subset of network nodes based on a mapping between the set of approved flight plan sectors and a position of each network node of the subset of network nodes, and transmit a node subset flight plan to the subset of the network nodes including the expected positions of the UE within the set of approved flight plan sectors. The communications manager 915 may be an example of aspects of the communications manager 1210 described herein.

The communications manager 915, or its sub-components, may be implemented in hardware, software (e.g., executed by a processor), or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
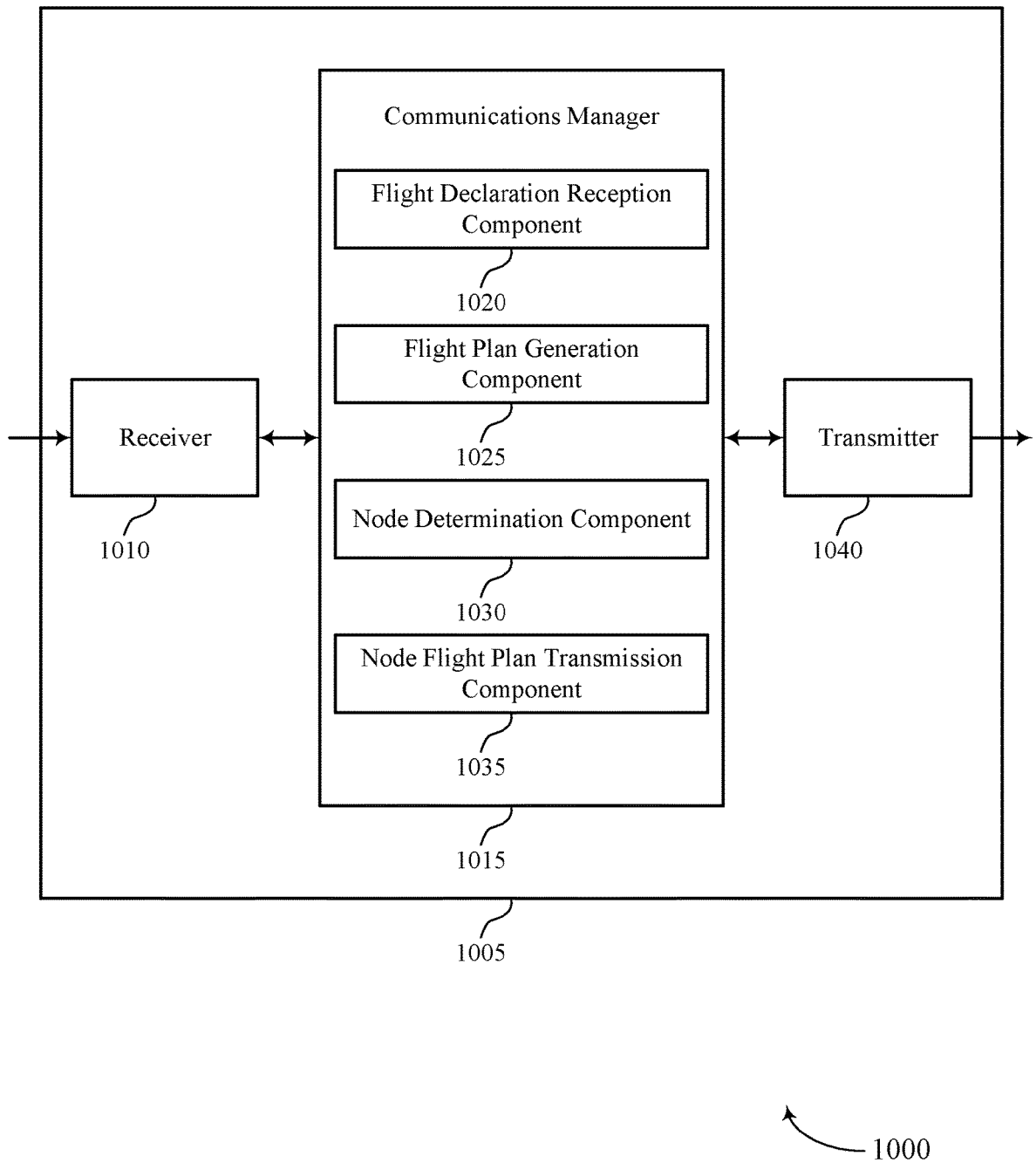

FIG. 10 shows a block diagram 1000 of a device 1005 that supports waypoint based flight declaration signaling in accordance with aspects of the present disclosure. The device 1005 may be an example of aspects of a device 905, or a network node or its components as described herein (e.g., a base station, a UFES, a USS, an AMF or a SMF). The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to waypoint based flight declaration signaling, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a flight declaration reception component 1020, a flight plan generation component 1025, a node determination component 1030, and a node flight plan transmission component 1035. The communications manager 1015 may be an example of aspects of the communications manager 1210 described herein.

The flight declaration reception component 1020 may receive a flight declaration request from a UE.

The flight plan generation component 1025 may generate, for the UE, an approved flight plan including a set of approved flight plan sectors based on the flight declaration request.

The node determination component 1030 may determine a subset of network nodes based on a mapping between the set of approved flight plan sectors and a position of each network node of the subset of network nodes.

The node flight plan transmission component 1035 may transmit a node subset flight plan to the subset of the network nodes including the expected positions of the UE within the set of approved flight plan sectors.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
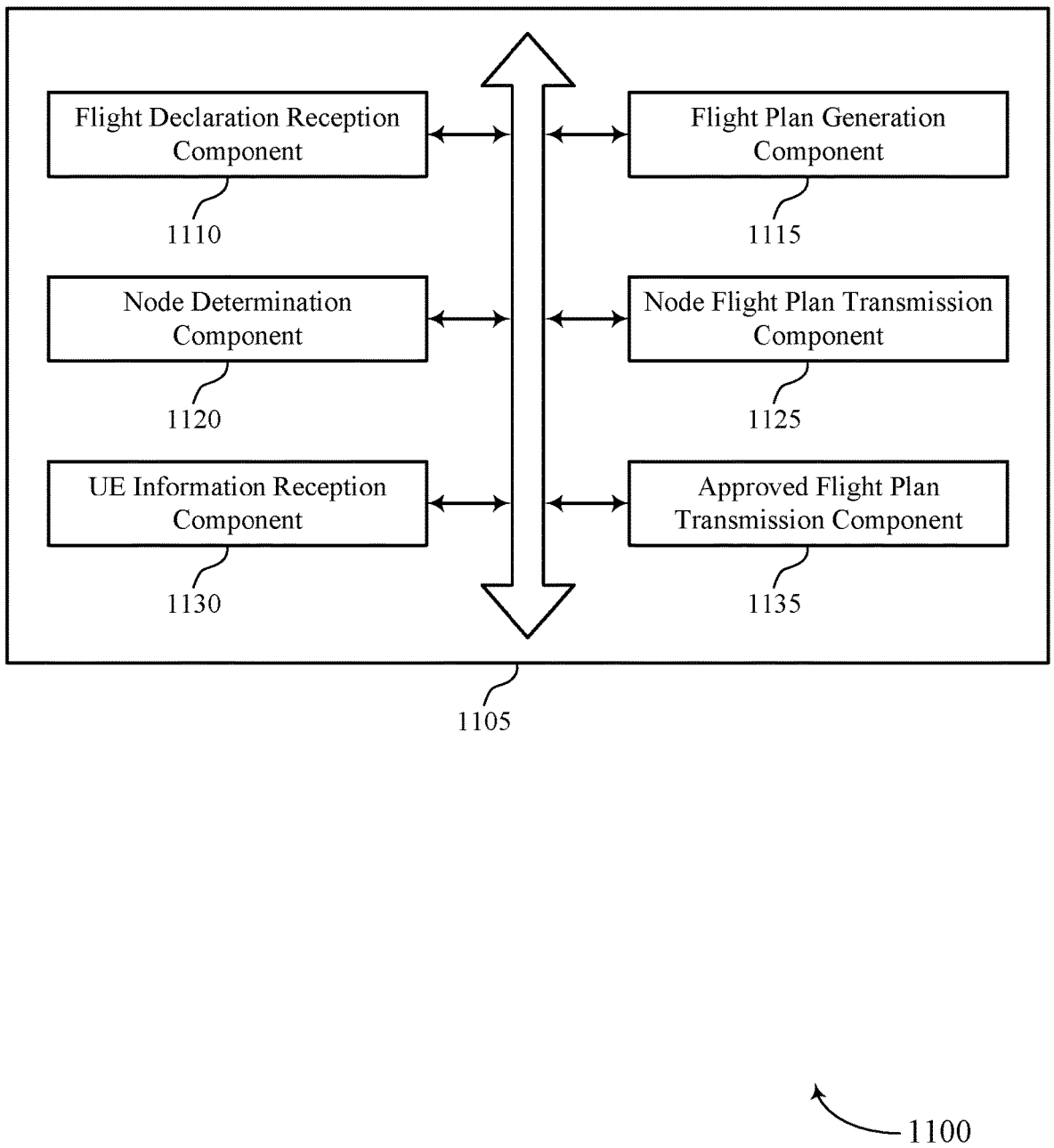
FIG. 11 shows a block diagram of a communications manager that supports waypoint based flight declaration signaling in accordance with aspects of the present disclosure.

FIG. 11 shows a block diagram 1100 of a communications manager 1105 that supports waypoint based flight declaration signaling in accordance with aspects of the present disclosure. The communications manager 1105 may be an example of aspects of a communications manager 915, a communications manager 1015, or a communications manager 1210 described herein. The communications manager 1105 may include a flight declaration reception component 1110, a flight plan generation component 1115, a node determination component 1120, a node flight plan transmission component 1125, an UE information reception component 1130, and an approved flight plan transmission component 1135. Each of these modules may communicate, directly or indirectly, with one another (e.g., via one or more buses).

The flight declaration reception component 1110 may receive a flight declaration request from a UE.

The flight plan generation component 1115 may generate, for the UE, an approved flight plan including a set of approved flight plan sectors based on the flight declaration request.

In some cases, the set of approved flight plan sectors includes a set of contiguous flight plan sectors.

In some cases, each flight plan sector of the set of contiguous flight plan sectors includes a volume and a time period corresponding to a duration that the UE is permitted to occupy the volume.

In some cases, each approved flight plan sector of the set of approved flight plan sectors includes one or both of a sector identification or a sector number.

The node determination component 1120 may determine a subset of network nodes based on a mapping between the set of approved flight plan sectors and a position of each network node of the subset of network nodes.

In some examples, the node determination component 1120 may calculate the expected positions of the UE within a subset of the set of approved flight plan sectors based on the position and coverage area of the subset of the network nodes.

In some cases, the node subset flight plan includes the expected positions of the UE within a coverage area of the subset of the network nodes.

The node flight plan transmission component 1125 may transmit a node subset flight plan to the subset of the network nodes including the expected positions of the UE within the set of approved flight plan sectors.

The UE information reception component 1130 may receive, from an access and mobility management function (AMF), UE information including one or more of a UE identifier, a UE registration area, or a UE location.

The approved flight plan transmission component 1135 may transmit the approved flight plan to the UE.

Figure 12:
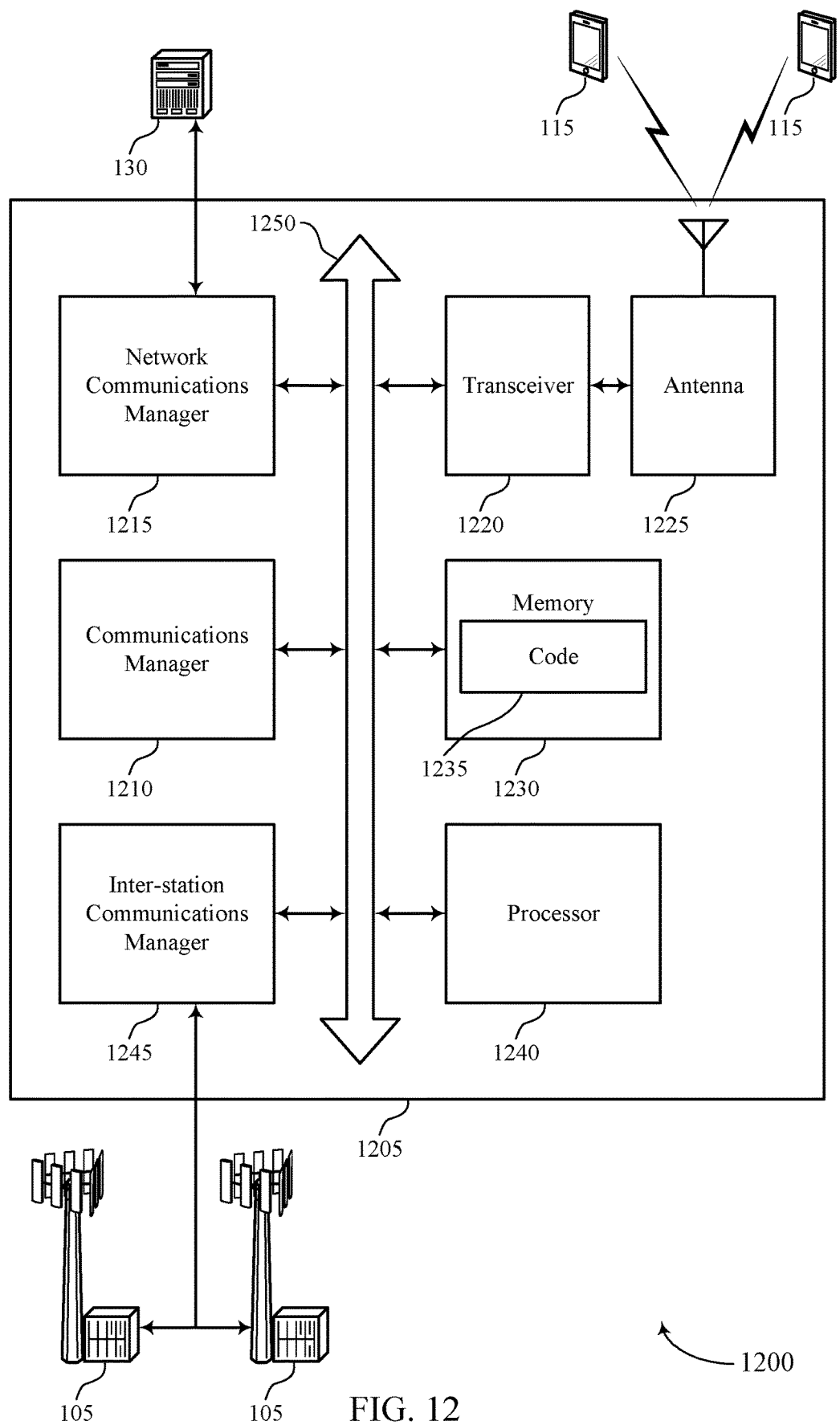
FIG. 12 shows a diagram of a system including a device that supports waypoint based flight declaration signaling in accordance with aspects of the present disclosure.

FIG. 12 shows a diagram of a system 1200 including a device 1205 that supports waypoint based flight declaration signaling in accordance with aspects of the present disclosure. The device 1205 may be an example of or include the components of device 905, device 1005, or a network node or its components as described herein (e.g., a base station, a UFES, a USS, an AMF or a SMF). The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive a flight declaration request from a UE, generate, for the UE, an approved flight plan including a set of approved flight plan sectors based on the flight declaration request, determine a subset of network nodes based on a mapping between the set of approved flight plan sectors and a position of each network node of the subset of network nodes, and transmit a node subset flight plan to the subset of the network nodes including the expected positions of the UE within the set of approved flight plan sectors.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting waypoint based flight declaration signaling).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
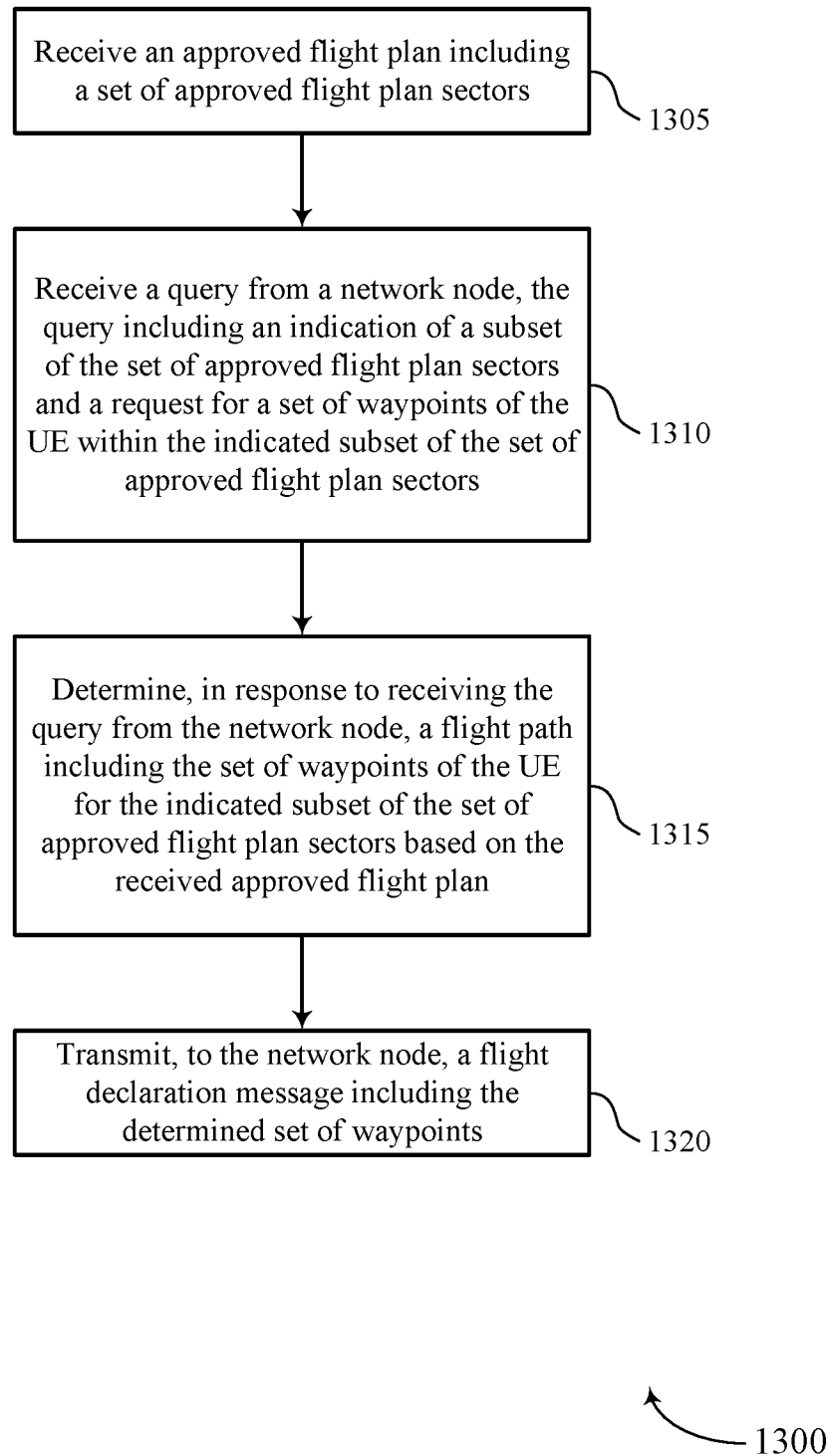
FIGS. 13 through 20 show flowcharts illustrating methods that support waypoint based flight declaration signaling in accordance with aspects of the present disclosure.

FIG. 13 shows a flowchart illustrating a method 1300 that supports waypoint based flight declaration signaling in accordance with aspects of the present disclosure. The operations of method 1300 may be implemented by a UE 115 (e.g., a UAV) or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive an approved flight plan including a set of approved flight plan sectors. The operations of 1305 may be performed according to the methods described herein. In some examples, aspects of the operations of 1305 may be performed by a flight plan reception component as described with reference to FIGS. 5 through 8.

At 1310, the UE may receive a query from a network node, the query including an indication of a subset of the set of approved flight plan sectors and a request for a set of waypoints of the UE within the indicated subset of the set of approved flight plan sectors. The operations of 1310 may be performed according to the methods described herein. In some examples, aspects of the operations of 1310 may be performed by a query reception component as described with reference to FIGS. 5 through 8.

At 1315, the UE may determine, in response to receiving the query from the network node, a flight path including the set of waypoints of the UE for the indicated subset of the set of approved flight plan sectors based on the received approved flight plan. The operations of 1315 may be performed according to the methods described herein. In some examples, aspects of the operations of 1315 may be performed by a flight path determination component as described with reference to FIGS. 5 through 8.

At 1320, the UE may transmit, to the network node, a flight declaration message including the determined set of waypoints. The operations of 1320 may be performed according to the methods described herein. In some examples, aspects of the operations of 1320 may be performed by a transmission component as described with reference to FIGS. 5 through 8.

Figure 14:
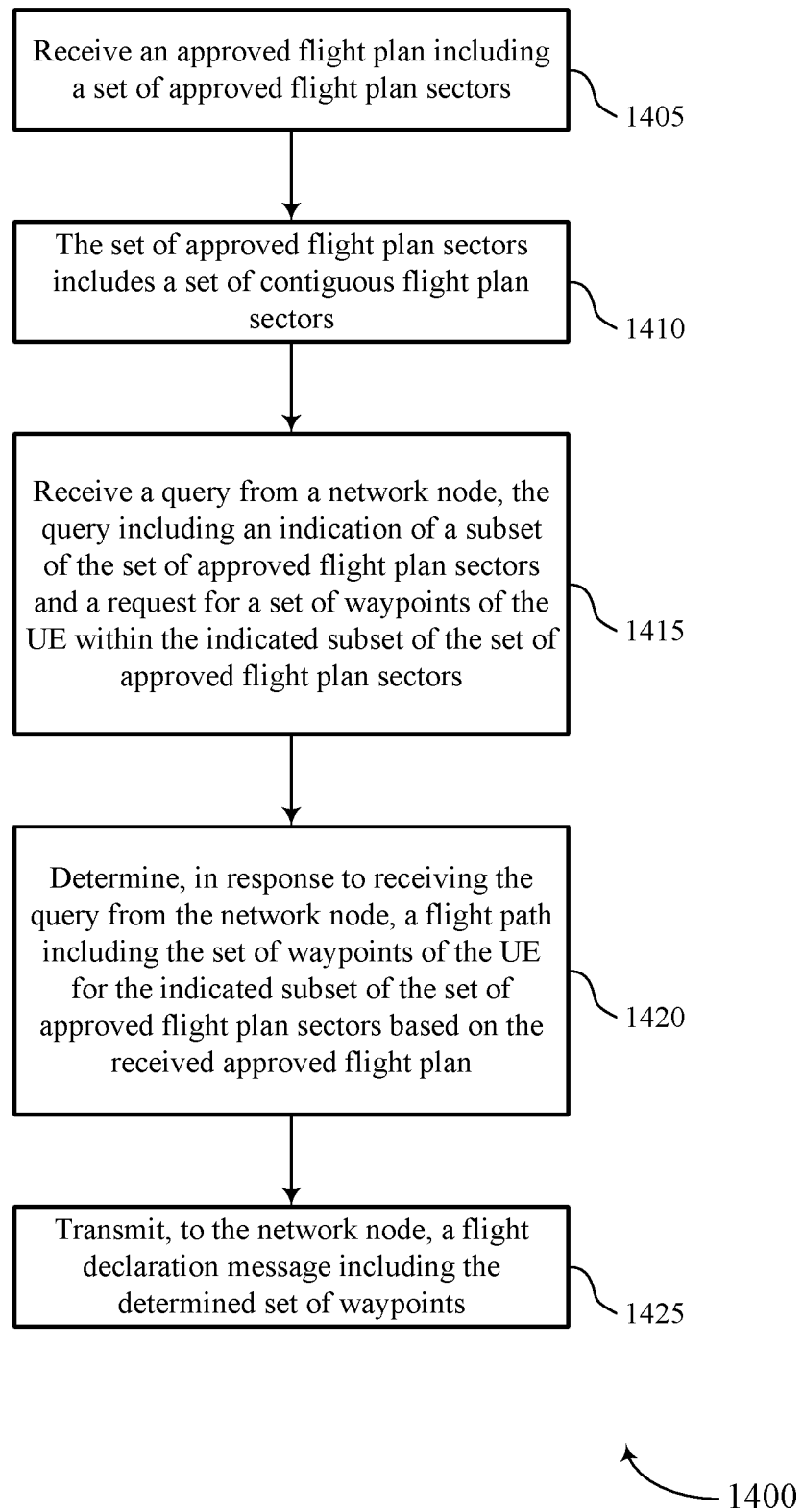

FIG. 14 shows a flowchart illustrating a method 1400 that supports waypoint based flight declaration signaling in accordance with aspects of the present disclosure. The operations of method 1400 may be implemented by a UE 115 (e.g., a UAV) or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive an approved flight plan including a set of approved flight plan sectors. The operations of 1405 may be performed according to the methods described herein. In some examples, aspects of the operations of 1405 may be performed by a flight plan reception component as described with reference to FIGS. 5 through 8.

At 1410, the set of approved flight plan sectors includes a set of contiguous flight plan sectors. The operations of 1410 may be performed according to the methods described herein. In some examples, aspects of the operations of 1410 may be performed by a flight plan reception component as described with reference to FIGS. 5 through 8.

At 1415, the UE may receive a query from a network node, the query including an indication of a subset of the set of approved flight plan sectors and a request for a set of waypoints of the UE within the indicated subset of the set of approved flight plan sectors. The operations of 1415 may be performed according to the methods described herein. In some examples, aspects of the operations of 1415 may be performed by a query reception component as described with reference to FIGS. 5 through 8.

At 1420, the UE may determine, in response to receiving the query from the network node, a flight path including the set of waypoints of the UE for the indicated subset of the set of approved flight plan sectors based on the received approved flight plan. The operations of 1420 may be performed according to the methods described herein. In some examples, aspects of the operations of 1420 may be performed by a flight path determination component as described with reference to FIGS. 5 through 8.

At 1425, the UE may transmit, to the network node, a flight declaration message including the determined set of waypoints. The operations of 1425 may be performed according to the methods described herein. In some examples, aspects of the operations of 1425 may be performed by a transmission component as described with reference to FIGS. 5 through 8.

Figure 15:
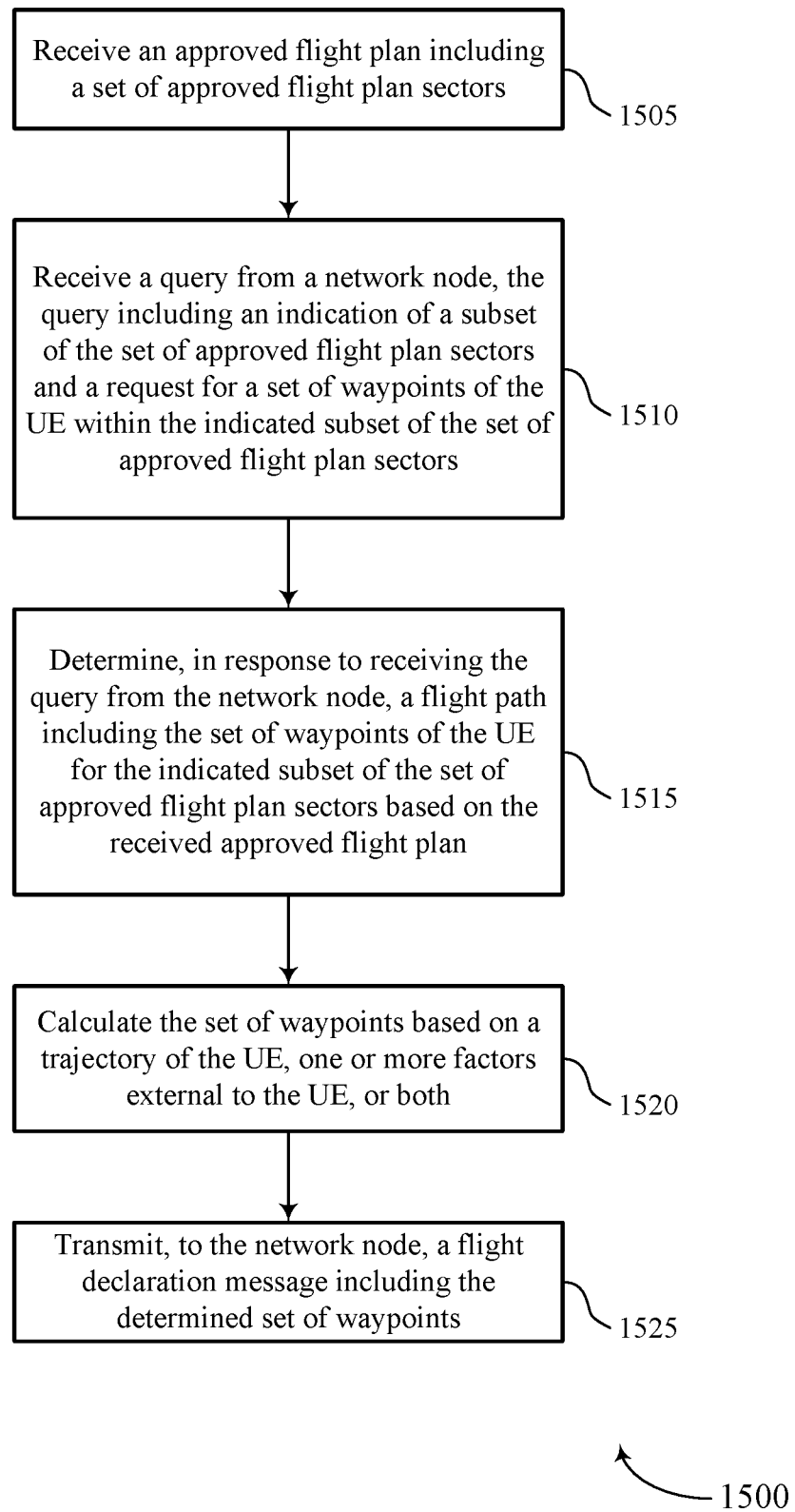

FIG. 15 shows a flowchart illustrating a method 1500 that supports waypoint based flight declaration signaling in accordance with aspects of the present disclosure. The operations of method 1500 may be implemented by a UE 115 (e.g., a UAV) or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive an approved flight plan including a set of approved flight plan sectors. The operations of 1505 may be performed according to the methods described herein. In some examples, aspects of the operations of 1505 may be performed by a flight plan reception component as described with reference to FIGS. 5 through 8.

At 1510, the UE may receive a query from a network node, the query including an indication of a subset of the set of approved flight plan sectors and a request for a set of waypoints of the UE within the indicated subset of the set of approved flight plan sectors. The operations of 1510 may be performed according to the methods described herein. In some examples, aspects of the operations of 1510 may be performed by a query reception component as described with reference to FIGS. 5 through 8.

At 1515, the UE may determine, in response to receiving the query from the network node, a flight path including the set of waypoints of the UE for the indicated subset of the set of approved flight plan sectors based on the received approved flight plan. The operations of 1515 may be performed according to the methods described herein. In some examples, aspects of the operations of 1515 may be performed by a flight path determination component as described with reference to FIGS. 5 through 8.

At 1520, the UE may calculate the set of waypoints based on a trajectory of the UE, one or more factors external to the UE, or both. The operations of 1520 may be performed according to the methods described herein. In some examples, aspects of the operations of 1520 may be performed by a flight path determination component as described with reference to FIGS. 5 through 8.

At 1525, the UE may transmit, to the network node, a flight declaration message including the determined set of waypoints. The operations of 1525 may be performed according to the methods described herein. In some examples, aspects of the operations of 1525 may be performed by a transmission component as described with reference to FIGS. 5 through 8.

Figure 16:
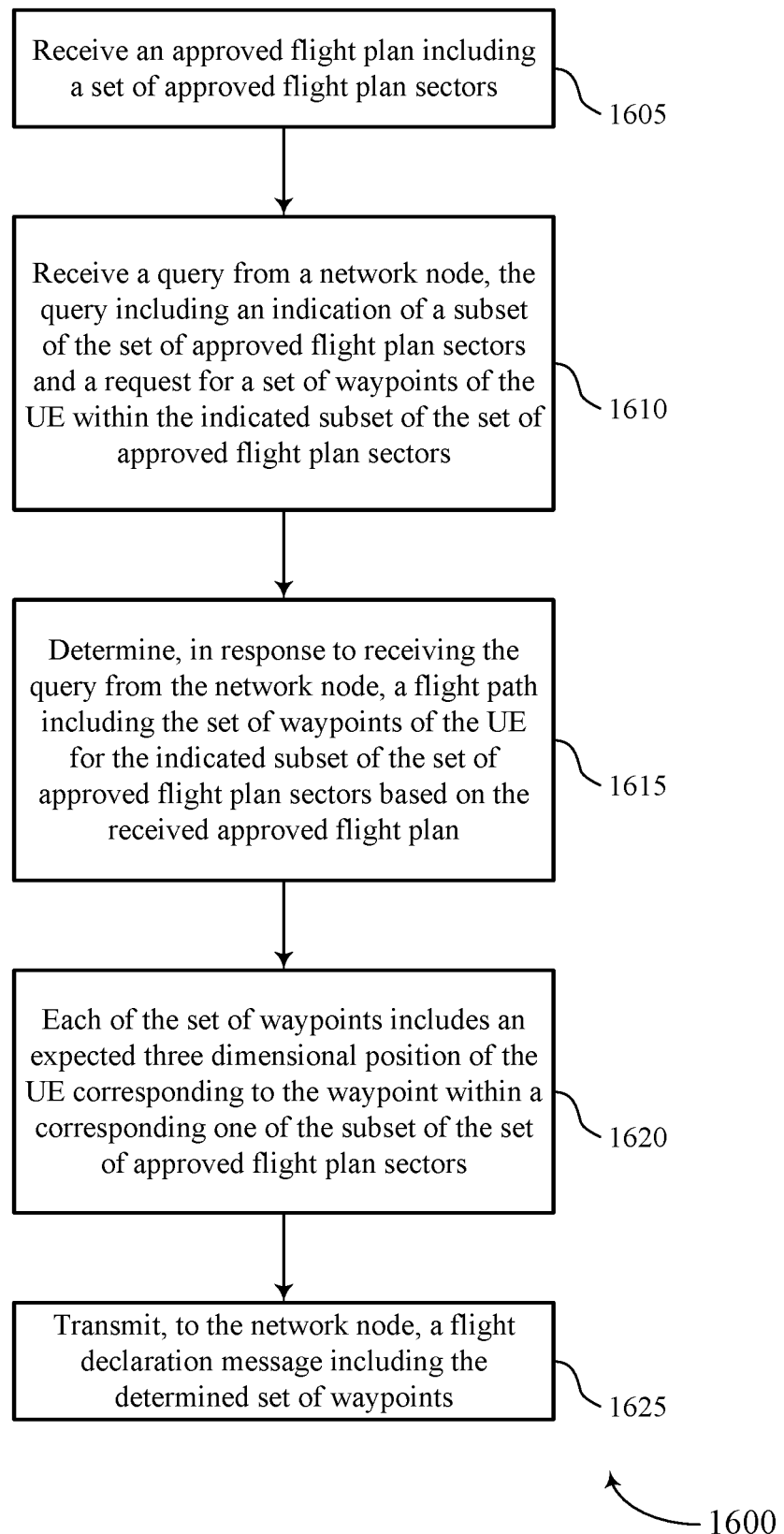

FIG. 16 shows a flowchart illustrating a method 1600 that supports waypoint based flight declaration signaling in accordance with aspects of the present disclosure. The operations of method 1600 may be implemented by a UE 115 (e.g., a UAV) or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive an approved flight plan including a set of approved flight plan sectors. The operations of 1605 may be performed according to the methods described herein. In some examples, aspects of the operations of 1605 may be performed by a flight plan reception component as described with reference to FIGS. 5 through 8.

At 1610, the UE may receive a query from a network node, the query including an indication of a subset of the set of approved flight plan sectors and a request for a set of waypoints of the UE within the indicated subset of the set of approved flight plan sectors. The operations of 1610 may be performed according to the methods described herein. In some examples, aspects of the operations of 1610 may be performed by a query reception component as described with reference to FIGS. 5 through 8.

At 1615, the UE may determine, in response to receiving the query from the network node, a flight path including the set of waypoints of the UE for the indicated subset of the set of approved flight plan sectors based on the received approved flight plan. The operations of 1615 may be performed according to the methods described herein. In some examples, aspects of the operations of 1615 may be performed by a flight path determination component as described with reference to FIGS. 5 through 8.

At 1620, each of the set of waypoints includes an expected three dimensional position of the UE corresponding to the waypoint within a corresponding one of the subset of the set of approved flight plan sectors. The operations of 1620 may be performed according to the methods described herein. In some examples, aspects of the operations of 1620 may be performed by a flight path determination component as described with reference to FIGS. 5 through 8.

At 1625, the UE may transmit, to the network node, a flight declaration message including the determined set of waypoints. The operations of 1625 may be performed according to the methods described herein. In some examples, aspects of the operations of 1625 may be performed by a transmission component as described with reference to FIGS. 5 through 8.

Figure 17:
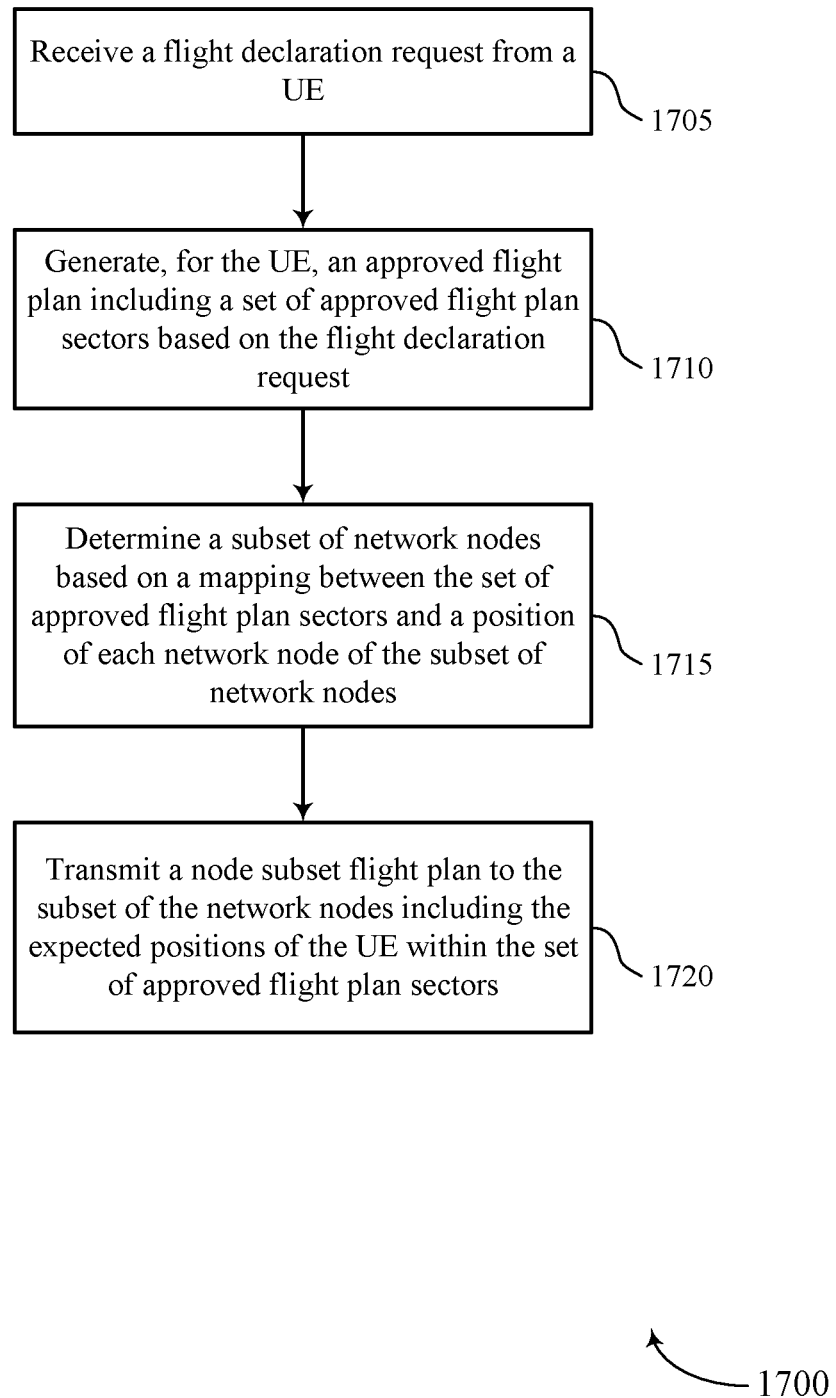

FIG. 17 shows a flowchart illustrating a method 1700 that supports waypoint based flight declaration signaling in accordance with aspects of the present disclosure. The operations of method 1700 may be implemented by a network node or its components as described herein (e.g., a base station, a UFES, a USS, an AMF or a SMF). For example, the operations of method 1700 may be performed by a communications manager as described with reference to FIGS. 9 through 12. In some examples, a network node may execute a set of instructions to control the functional elements of the network node to perform the functions described below. Additionally or alternatively, a network node may perform aspects of the functions described below using special-purpose hardware.

At 1705, the network node may receive a flight declaration request from a UE. The operations of 1705 may be performed according to the methods described herein. In some examples, aspects of the operations of 1705 may be performed by a flight declaration reception component as described with reference to FIGS. 9 through 12.

At 1710, the network node may generate, for the UE, an approved flight plan including a set of approved flight plan sectors based on the flight declaration request. The operations of 1710 may be performed according to the methods described herein. In some examples, aspects of the operations of 1710 may be performed by a flight plan generation component as described with reference to FIGS. 9 through 12.

At 1715, the network node may determine a subset of network nodes based on a mapping between the set of approved flight plan sectors and a position of each network node of the subset of network nodes. The operations of 1715 may be performed according to the methods described herein. In some examples, aspects of the operations of 1715 may be performed by a node determination component as described with reference to FIGS. 9 through 12.

At 1720, the network node may transmit a node subset flight plan to the subset of the network nodes including the expected positions of the UE within the set of approved flight plan sectors. The operations of 1720 may be performed according to the methods described herein. In some examples, aspects of the operations of 1720 may be performed by a node flight plan transmission component as described with reference to FIGS. 9 through 12.

Figure 18:
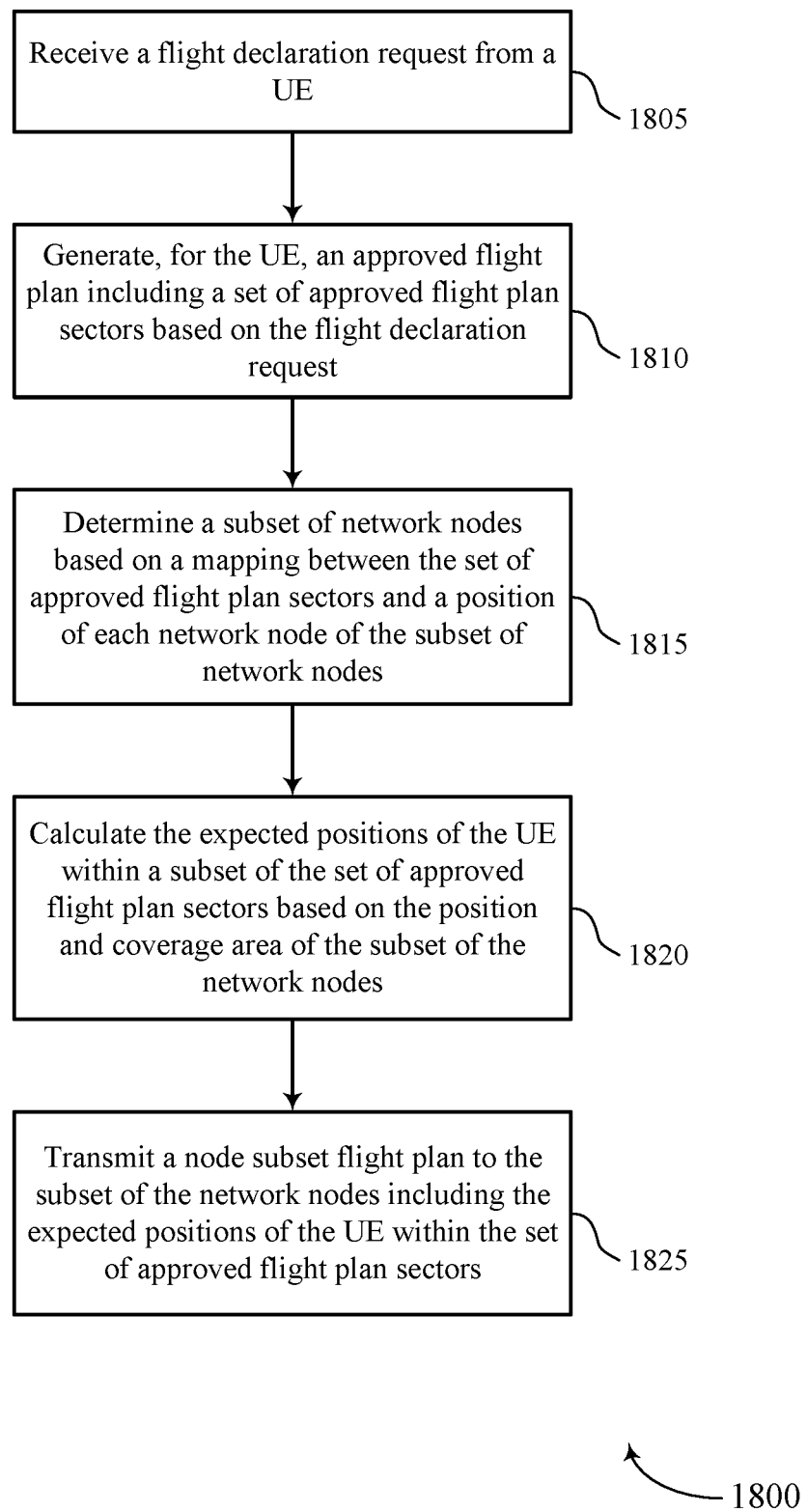

FIG. 18 shows a flowchart illustrating a method 1800 that supports waypoint based flight declaration signaling in accordance with aspects of the present disclosure. The operations of method 1800 may be implemented by a network node or its components as described herein (e.g., a base station, a UFES, a USS, an AMF or a SMF). For example, the operations of method 1800 may be performed by a communications manager as described with reference to FIGS. 9 through 12. In some examples, a network node may execute a set of instructions to control the functional elements of the network node to perform the functions described below. Additionally or alternatively, a network node may perform aspects of the functions described below using special-purpose hardware.

At 1805, the network node may receive a flight declaration request from a UE. The operations of 1805 may be performed according to the methods described herein. In some examples, aspects of the operations of 1805 may be performed by a flight declaration reception component as described with reference to FIGS. 9 through 12.

At 1810, the network node may generate, for the UE, an approved flight plan including a set of approved flight plan sectors based on the flight declaration request. The operations of 1810 may be performed according to the methods described herein. In some examples, aspects of the operations of 1810 may be performed by a flight plan generation component as described with reference to FIGS. 9 through 12.

At 1815, the network node may determine a subset of network nodes based on a mapping between the set of approved flight plan sectors and a position of each network node of the subset of network nodes. The operations of 1815 may be performed according to the methods described herein. In some examples, aspects of the operations of 1815 may be performed by a node determination component as described with reference to FIGS. 9 through 12.

At 1820, the network node may calculate the expected positions of the UE within a subset of the set of approved flight plan sectors based on the position and coverage area of the subset of the network nodes. The operations of 1820 may be performed according to the methods described herein. In some examples, aspects of the operations of 1820 may be performed by a node determination component as described with reference to FIGS. 9 through 12.

At 1825, the network node may transmit a node subset flight plan to the subset of the network nodes including the expected positions of the UE within the set of approved flight plan sectors. The operations of 1825 may be performed according to the methods described herein. In some examples, aspects of the operations of 1825 may be performed by a node flight plan transmission component as described with reference to FIGS. 9 through 12.

Figure 19:
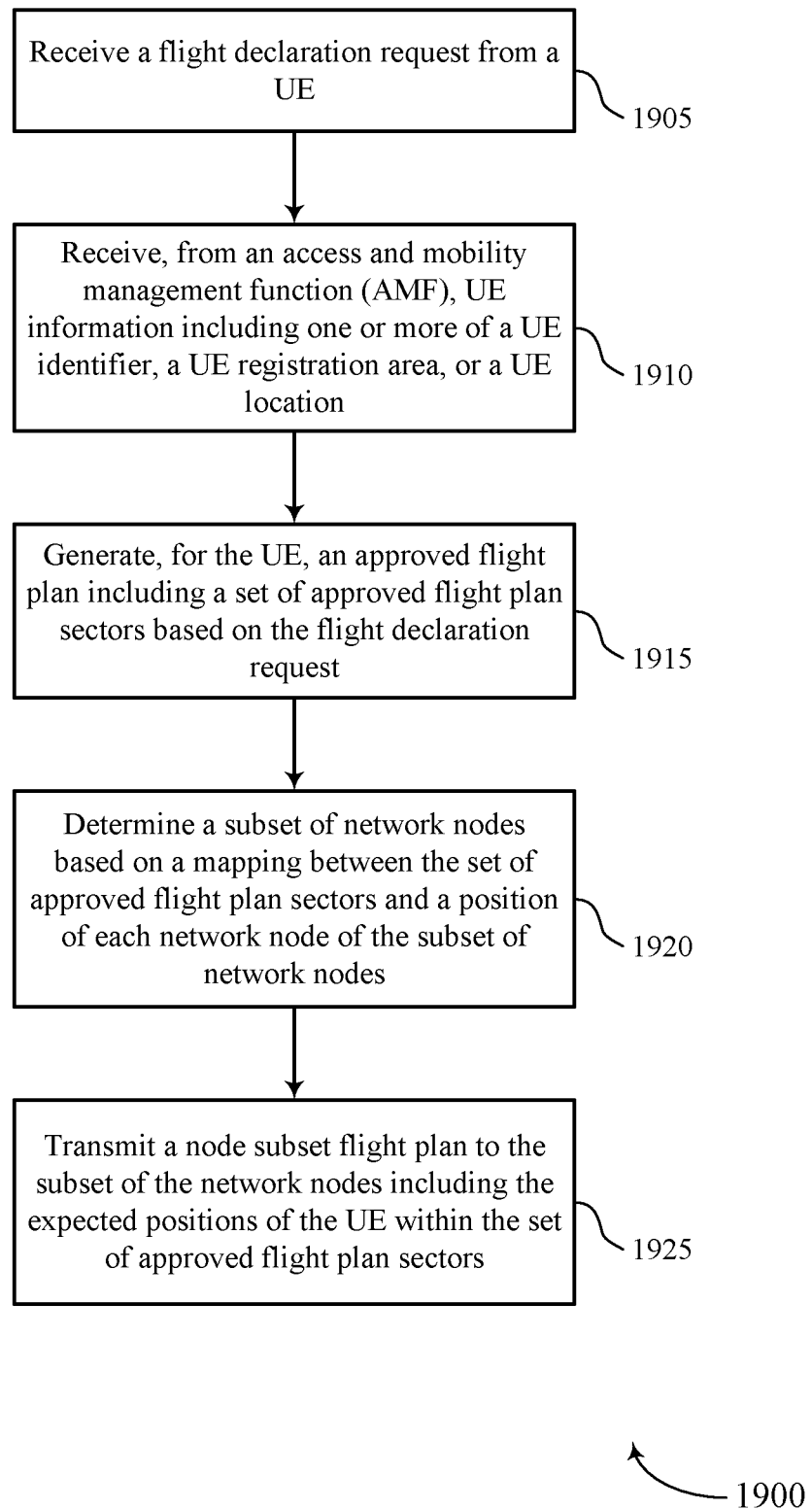

FIG. 19 shows a flowchart illustrating a method 1900 that supports waypoint based flight declaration signaling in accordance with aspects of the present disclosure. The operations of method 1900 may be implemented by a network node or its components as described herein (e.g., a base station, a UFES, a USS, an AMF or a SMF). For example, the operations of method 1900 may be performed by a communications manager as described with reference to FIGS. 9 through 12. In some examples, a network node may execute a set of instructions to control the functional elements of the network node to perform the functions described below. Additionally or alternatively, a network node may perform aspects of the functions described below using special-purpose hardware.

At 1905, the network node may receive a flight declaration request from a UE. The operations of 1905 may be performed according to the methods described herein. In some examples, aspects of the operations of 1905 may be performed by a flight declaration reception component as described with reference to FIGS. 9 through 12.

At 1910, the network node may receive, from an access and mobility management function (AMF), UE information including one or more of a UE identifier, a UE registration area, or a UE location. The operations of 1910 may be performed according to the methods described herein. In some examples, aspects of the operations of 1910 may be performed by an UE information reception component as described with reference to FIGS. 9 through 12.

At 1915, the network node may generate, for the UE, an approved flight plan including a set of approved flight plan sectors based on the flight declaration request. The operations of 1915 may be performed according to the methods described herein. In some examples, aspects of the operations of 1915 may be performed by a flight plan generation component as described with reference to FIGS. 9 through 12.

At 1920, the network node may determine a subset of network nodes based on a mapping between the set of approved flight plan sectors and a position of each network node of the subset of network nodes. The operations of 1920 may be performed according to the methods described herein. In some examples, aspects of the operations of 1920 may be performed by a node determination component as described with reference to FIGS. 9 through 12.

At 1925, the network node may transmit a node subset flight plan to the subset of the network nodes including the expected positions of the UE within the set of approved flight plan sectors. The operations of 1925 may be performed according to the methods described herein. In some examples, aspects of the operations of 1925 may be performed by a node flight plan transmission component as described with reference to FIGS. 9 through 12.

Figure 20:
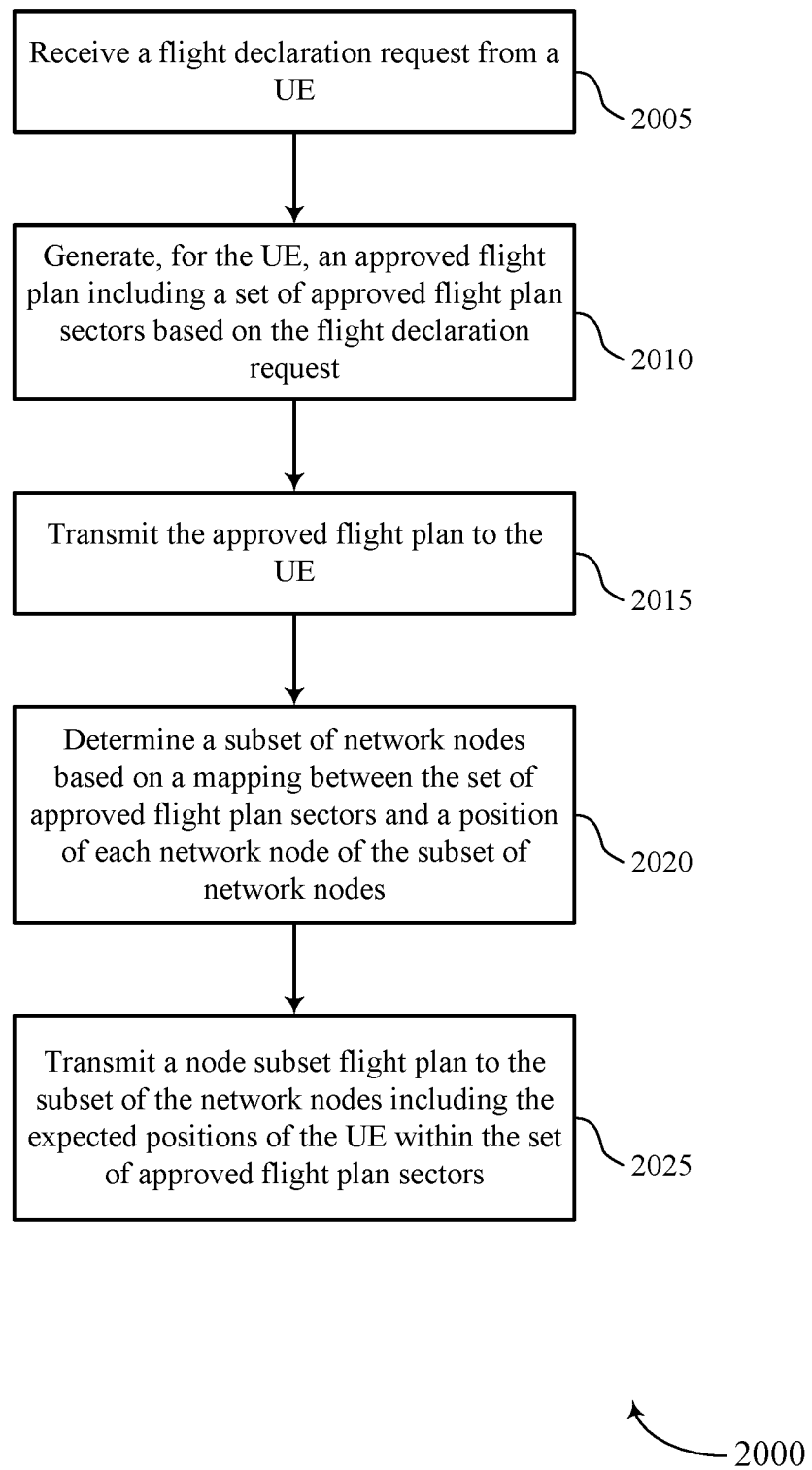

FIG. 20 shows a flowchart illustrating a method 2000 that supports waypoint based flight declaration signaling in accordance with aspects of the present disclosure. The operations of method 2000 may be implemented by a network node or its components as described herein (e.g., a base station, a UFES, a USS, an AMF or a SMF). For example, the operations of method 2000 may be performed by a communications manager as described with reference to FIGS. 9 through 12. In some examples, a network node may execute a set of instructions to control the functional elements of the network node to perform the functions described below. Additionally or alternatively, a network node may perform aspects of the functions described below using special-purpose hardware.

At 2005, the network node may receive a flight declaration request from a UE. The operations of 2005 may be performed according to the methods described herein. In some examples, aspects of the operations of 2005 may be performed by a flight declaration reception component as described with reference to FIGS. 9 through 12.

At 2010, the network node may generate, for the UE, an approved flight plan including a set of approved flight plan sectors based on the flight declaration request. The operations of 2010 may be performed according to the methods described herein. In some examples, aspects of the operations of 2010 may be performed by a flight plan generation component as described with reference to FIGS. 9 through 12.

At 2015, the network node may transmit the approved flight plan to the UE. The operations of 2015 may be performed according to the methods described herein. In some examples, aspects of the operations of 2015 may be performed by an approved flight plan transmission component as described with reference to FIGS. 9 through 12.

At 2020, the network node may determine a subset of network nodes based on a mapping between the set of approved flight plan sectors and a position of each network node of the subset of network nodes. The operations of 2020 may be performed according to the methods described herein. In some examples, aspects of the operations of 2020 may be performed by a node determination component as described with reference to FIGS. 9 through 12.

At 2025, the network node may transmit a node subset flight plan to the subset of the network nodes including the expected positions of the UE within the set of approved flight plan sectors. The operations of 2025 may be performed according to the methods described herein. In some examples, aspects of the operations of 2025 may be performed by a node flight plan transmission component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE) provided at an unmanned aerial vehicle (UAV), comprising:

receiving, from an unmanned aircraft system (UAS) service supplier (USS), a first message comprising an approved flight plan for the UAV, the received approved flight plan comprising a plurality of approved four-dimensional flight plan sectors;
  receiving, from a network node of a plurality of network nodes in a wireless communication system, a second message comprising a query indicating a subset of approved four-dimensional flight plan sectors of the plurality of approved four-dimensional flight plan sectors and a request for three-dimensional waypoints of the UE within the indicated subset of approved four-dimensional flight plan sectors, the query being based at least in part on a mapping between the subset of approved four-dimensional flight plan sectors and a position of each network node in a subset of the plurality of network nodes;
  determining, at the UE, in response to receiving the second message comprising the query from the network node, a flight path comprising a plurality of three-dimensional waypoints of the UE for the indicated subset of approved four-dimensional flight plan sectors of the received approved flight plan;
  transmitting, to the network node, a flight declaration message comprising the plurality of three-dimensional waypoints of the UE; and
  instructing the UAV to travel in accordance with the flight path comprising the plurality of the three-dimensional waypoints of the UE based at least in part on the flight declaration message.

2. The method of claim 1, wherein determining the flight path comprises:
  calculating the plurality of three-dimensional waypoints based at least in part on a trajectory of the UE, one or more factors external to the UE, or both.

3. The method of claim 1, wherein the query indicates a minimum, a maximum, or both, of number of three-dimensional waypoints for inclusion in the flight declaration message.

4. The method of claim 1, wherein receiving the second message comprising the query comprises:
  receiving, from the network node, the second message comprising the query via radio resource control (RRC) signaling.

5. The method of claim 1, wherein receiving the second message comprising the query comprises:
  receiving, from a plurality of network nodes, a plurality of messages comprising queries, wherein the plurality of messages includes the second message.

6. The method of claim 1, wherein each three-dimensional waypoint of the plurality of three-dimensional waypoints comprises an expected three dimensional position of the UE corresponding to a three-dimensional waypoint within a corresponding one of the subset of approved four-dimensional flight plan sectors.

7. The method of claim 6, wherein each three-dimensional waypoint of the plurality of three-dimensional waypoints further comprises a timestamp indicating a minimum expected entry time and a maximum expected exit time of the UE corresponding to the expected three dimensional position corresponding to the three-dimensional waypoint.

8. The method of claim 1, wherein the plurality of approved four-dimensional flight plan sectors comprises a plurality of contiguous four-dimensional flight plan sectors.

9. The method of claim 8, wherein each four-dimensional flight plan sector of the plurality of contiguous four-dimensional flight plan sectors comprises a volume and a time period corresponding to a duration that the UE is permitted to occupy the volume.

10. The method of claim 8, wherein each approved four-dimensional flight plan sector of the plurality of approved four-dimensional flight plan sectors comprises one or both of a sector identification or a sector number.

11. An apparatus for wireless communications at a user equipment (UE) provided at an unmanned aerial vehicle (UAV), comprising:
at least one processor; and
memory coupled to the at least one processor, the memory storing instructions executable by the at least one processor to cause the UE to:
receive, from an unmanned aircraft system (UAS) service supplier (USS), a first message comprising an approved flight plan for the UAV, the received approved flight plan comprising a plurality of approved four-dimensional flight plan sectors;
receive, from a network node of a plurality of network nodes in a wireless communication system, a second message comprising a query indicating a subset of approved four-dimensional flight plan sectors of the plurality of approved four-dimensional flight plan sectors and a request for three-dimensional waypoints of the UE within the indicated subset of approved four-dimensional flight plan sectors, the query being based at least in part on a mapping between the subset of approved four-dimensional flight plan sectors and a position of each network node in a subset of the plurality of network nodes;
determine, at the UE, in response to receiving the second message comprising the query from the network node, a flight path comprising a plurality of three-dimensional waypoints of the UE for the indicated subset of approved four-dimensional flight plan sectors of the received approved flight plan;
transmit, to the network node, a flight declaration message comprising the plurality of three-dimensional waypoints of the UE; and
instruct the UAV to travel in accordance with the flight path comprising the plurality of the three-dimensional waypoints of the UE based at least in part on the flight declaration message.

12. The apparatus of claim 11, wherein the instructions to determine the flight path are executable by the at least one processor to cause the UE to:
calculate the plurality of three-dimensional waypoints based at least in part on a trajectory of the UE, one or more factors external to the UE, or both.

13. The apparatus of claim 11, wherein the query indicates a minimum, a maximum, or both, of number of three-dimensional waypoints for inclusion in the flight declaration message.

14. The apparatus of claim 11, wherein the instructions to receive the query are executable by the at least one processor to cause the UE to:
receive, from the network node, the query via radio resource control (RRC) signaling.

15. The apparatus of claim 11, wherein the instructions to receive the second message comprising the query are executable by the at least one processor to cause the UE to:
receive, from a plurality of network nodes, a plurality of messages comprising queries, wherein the plurality of messages includes the second message.

16. The apparatus of claim 11, wherein each three-dimensional waypoint of the plurality of three-dimensional waypoints comprises an expected three dimensional position of the UE corresponding to a three-dimensional waypoint within a corresponding one of the subset of approved four-dimensional flight plan sectors.

17. The apparatus of claim 16, wherein each three-dimensional waypoint of the plurality of three-dimensional waypoints further comprises a timestamp indicating a minimum expected entry time and a maximum expected exit time of the UE corresponding to the expected three dimensional position corresponding to the three-dimensional waypoint.

18. The apparatus of claim 11, wherein the plurality of approved four-dimensional flight plan sectors comprises a plurality of contiguous four-dimensional flight plan sectors.

19. The apparatus of claim 18, wherein each four-dimensional flight plan sector of the plurality of contiguous four-dimensional flight plan sectors comprises a volume and a time period corresponding to a duration that the UE is permitted to occupy the volume.

20. The apparatus of claim 18, wherein each approved four-dimensional flight plan sector of the plurality of approved four-dimensional flight plan sectors comprises one or both of a sector identification or a sector number.

21. An apparatus for wireless communications at a user equipment (UE) provided at an unmanned aerial vehicle (UAV), comprising:
means for receiving, from an unmanned aircraft system (UAS) service supplier (USS), a first message comprising an approved flight plan for the UAV, the received approved flight plan comprising a plurality of approved four-dimensional flight plan sectors;
means for receiving, from a network node of a plurality of network nodes in a wireless communication system, a second message comprising a query indicating a subset of approved four-dimensional flight plan sectors of the plurality of approved four-dimensional flight plan sectors and a request for three-dimensional waypoints of the UE within the indicated subset of approved four-dimensional flight plan sectors, the query being based at least in part on a mapping between the subset of approved four-dimensional flight plan sectors and a position of each network node in a subset of the plurality of network nodes;
means for determining, at the UE, in response to receiving the second message comprising the query from the network node, a flight path comprising a plurality of three-dimensional waypoints of the UE for the indicated subset of approved four-dimensional flight plan sectors of the received approved flight plan;
means for transmitting, to the network node, a flight declaration message comprising the plurality of three-dimensional waypoints of the UE; and
means for instructing the UAV to travel in accordance with the flight path comprising the plurality of the three-dimensional waypoints of the UE based at least in part on the flight declaration message.

22. The apparatus of claim 21, wherein the means for determining the flight path comprise:
means for calculating the plurality of three-dimensional waypoints based at least in part on a trajectory of the UE, one or more factors external to the UE, or both.

23. The apparatus of claim 21, wherein the query indicates a minimum, a maximum, or both, of number of three-dimensional waypoints for inclusion in the flight declaration message.

24. The apparatus of claim 21, wherein the means for receiving, from the network node, the message comprising the query comprise:
  means for receiving, from the network node, the second message comprising the query via radio resource control (RRC) signaling.

25. The apparatus of claim 21, wherein the means for receiving, from the network node, the second message comprising the query comprise:
  means for receiving, from a plurality of network nodes, a plurality of messages comprising queries, wherein the plurality of messages includes the second message.

26. A non-transitory computer-readable medium storing code for wireless communications at a user equipment (UE) provided at an unmanned aerial vehicle (UAV), the code comprising instructions executable by a processor to:
  receive, from an unmanned aircraft system (UAS) service supplier (USS), a first message comprising an approved flight plan for the UAV, the received approved flight plan comprising a plurality of approved four-dimensional flight plan sectors;
  receive, from a network node of a plurality of network nodes in a wireless communication system, a second message comprising a query indicating a subset of approved four-dimensional flight plan sectors of the plurality of approved four-dimensional flight plan sectors and a request for three-dimensional waypoints of the UE within the indicated subset of approved four-dimensional flight plan sectors, the query being based at least in part on a mapping between the subset of approved four-dimensional flight plan sectors and a position of each network node in a subset of the plurality of network nodes;
  determine, at the UE, in response to receiving the second message comprising the query from the network node, a flight path comprising a plurality of three-dimensional waypoints of the UE for the indicated subset of approved four-dimensional flight plan sectors of the received approved flight plan;
  transmit, to the network node, a flight declaration message comprising the plurality of three-dimensional waypoints of the UE; and
  instruct the UAV to travel in accordance with the flight path comprising the plurality of the three-dimensional waypoints of the UE based at least in part on the flight declaration message.

27. The non-transitory computer-readable medium of claim 26, wherein the instructions to determine the flight path are executable by the processor to:
  calculate the plurality of three-dimensional waypoints based at least in part on a trajectory of the UE, one or more factors external to the UE, or both.

28. The non-transitory computer-readable medium of claim 26, wherein the query indicates a minimum, a maximum, or both, of number of three-dimensional waypoints for inclusion in the flight declaration message.

29. The non-transitory computer-readable medium of claim 26, wherein the instructions to receive, from the network node, the second message comprising the query are executable by the processor to:
  receive, from the network node, the second message comprising the query via radio resource control (RRC) signaling.

30. The non-transitory computer-readable medium of claim 26, wherein the instructions to receive, from the network node, the second message comprising the query are executable by the processor to:
  receive, from a plurality of network nodes, a plurality of messages comprising queries, wherein the plurality of messages includes the second message.

* * * * *